US012798601B2

(12) United States Patent
Fields et al.

(10) Patent No.: US 12,798,601 B2
(45) **Date of Patent: *Nov. 17, 2026**

(54) SYSTEMS AND METHODS FOR EMERGENCY VEHICLE WARNINGS VIA AUGMENTED REALITY

(71) Applicant: STATE FARM MUTUAL AUTOMOBILE INSURANCE COMPANY, Bloomington, IL (US)

(72) Inventors: Brian M. Fields, Phoenix, AZ (US); Nathan L. Tofte, Downs, IL (US); Aaron C. Williams, Bloomington, IL (US); Joseph P. Harr, Bloomington, IL (US); Vicki King, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/975,535

(22) Filed: Dec. 10, 2024

(65) Prior Publication Data

US 2025/0100576 A1 Mar. 27, 2025

Related U.S. Application Data

(63) Continuation of application No. 17/962,017, filed on Oct. 7, 2022, now Pat. No. 12,187,308.

(Continued)

(51) Int. Cl.
*B60W 50/14* (2020.01)
*B60K 35/00* (2024.01)
(Continued)

(52) U.S. Cl.
CPC ............ *B60W 50/14* (2013.01); *B60K 35/00* (2013.01); *B60K 35/233* (2024.01); *B60K 35/235* (2024.01); *B60K 35/28* (2024.01); *B60K 35/29* (2024.01); *B60K 35/81* (2024.01); *B60W 40/02* (2013.01); *B60W 40/04* (2013.01);
(Continued)

(58) Field of Classification Search
None
See application file for complete search history.

(56) References Cited

U.S. PATENT DOCUMENTS 9,830,748 B2 11/2017 Rosenbaum
9,990,782 B2 6/2018 Rosenbaum
(Continued)

FOREIGN PATENT DOCUMENTS

EP 3239686 A1 11/2017
EP 3578433 B1 8/2020
(Continued)

*Primary Examiner* — Thomas S Mccormack
(74) *Attorney, Agent, or Firm* — MARSHALL, GERSTEIN & BORUN LLP; Randall G. Rueth

(57) ABSTRACT

Systems and methods for enhanced emergency vehicle warnings via Augmented Reality (AR) are provided. An example system may obtain a wireless communication signal indicating a position of an emergency vehicle, determine a field of view of an occupant of the vehicle associated with an AR viewer, and based upon a comparison of the position of the emergency vehicle and the field of view, present an alert via the AR viewer.

18 Claims, 13 Drawing Sheets

Related U.S. Application Data

(60) Provisional application No. 63/397,447, filed on Aug. 12, 2022.

(51) Int. Cl.

| | |
|---|---|
| ***B60K 35/233*** | (2024.01) |
| ***B60K 35/235*** | (2024.01) |
| ***B60K 35/28*** | (2024.01) |
| ***B60K 35/29*** | (2024.01) |
| ***B60K 35/65*** | (2024.01) |
| ***B60K 35/81*** | (2024.01) |
| ***B60Q 9/00*** | (2006.01) |
| ***B60W 40/02*** | (2006.01) |
| ***B60W 40/04*** | (2006.01) |
| ***B60W 40/08*** | (2012.01) |
| ***G01C 21/34*** | (2006.01) |
| ***G01S 1/04*** | (2006.01) |
| ***G02B 27/01*** | (2006.01) |
| ***G06F 40/279*** | (2020.01) |
| ***G06Q 50/12*** | (2012.01) |
| ***G06T 19/00*** | (2011.01) |
| ***G06V 20/59*** | (2022.01) |

(52) U.S. Cl.

CPC ............. *B60W 40/08* (2013.01); *G01S 1/042* (2013.01); *G02B 27/0172* (2013.01); *G06T 19/006* (2013.01); *G06V 20/593* (2022.01); *B60K 35/65* (2024.01); *B60K 2360/166* (2024.01); *B60K 2360/176* (2024.01); *B60K 2360/177* (2024.01); *B60K 2360/178* (2024.01); *B60K 2360/1868* (2024.01); *B60K 2360/741* (2024.01); *B60Q 9/00* (2013.01); *B60W 2050/146* (2013.01); *B60W 2420/403* (2013.01); *B60W 2540/225* (2020.02); *B60W 2540/227* (2020.02); *B60W 2554/4041* (2020.02); *B60W 2556/40* (2020.02); *B60W 2556/45* (2020.02); *G01C 21/3476* (2013.01); *G02B 2027/0138* (2013.01); *G02B 2027/014* (2013.01); *G06F 40/279* (2020.01); *G06Q 50/12* (2013.01)

(56) References Cited

U.S. PATENT DOCUMENTS

| | | | | |
|---|---|---|---|---|
| 10,269,190 | B2 | 4/2019 | Rosenbaum | |
| 10,467,824 | B2 | 11/2019 | Rosenbaum | |
| 11,180,159 | B1 * | 11/2021 | Post | G08G 1/04 |
| 11,227,452 | B2 | 1/2022 | Rosenbaum | |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 12,187,308 | B2 * | 1/2025 | Fields | B60W 40/04 |
| 2002/0050927 | A1 | 5/2002 | De Moerloose et al. | |
| 2004/0179040 | A1 | 9/2004 | Patel et al. | |
| 2010/0253526 | A1 | 10/2010 | Szczerba et al. | |
| 2013/0335303 | A1 | 12/2013 | Maciocci et al. | |
| 2015/0015479 | A1 | 1/2015 | Cho | |
| 2015/0126281 | A1 | 5/2015 | Lewis | |
| 2015/0216466 | A1 | 8/2015 | Kronberg et al. | |
| 2015/0278370 | A1 | 10/2015 | Stratvert et al. | |
| 2016/0120403 | A1 | 5/2016 | Mochizuki et al. | |
| 2016/0267335 | A1 | 9/2016 | Hampiholi | |
| 2017/0151883 | A1 | 6/2017 | Bae et al. | |
| 2017/0155867 | A1 | 6/2017 | Yokota et al. | |
| 2017/0213459 | A1 | 7/2017 | Ogaz | |
| 2018/0143635 | A1 | 5/2018 | Zijderveld et al. | |
| 2019/0089999 | A1 | 3/2019 | Neumeier et al. | |
| 2019/0102636 | A1 * | 4/2019 | Koravadi | G02B 27/017 |
| 2022/0092893 | A1 | 3/2022 | Rosenbaum | |
| 2022/0340148 | A1 | 10/2022 | Rosenbaum | |
| 2023/0060300 | A1 | 3/2023 | Rosenbaum | |
| 2023/0111436 | A1 * | 4/2023 | Petit | B60K 35/29<br>340/902 |
| 2023/0162595 | A1 * | 5/2023 | Seder | G08G 1/096716<br>701/428 |
| 2023/0264706 | A1 | 8/2023 | Yasuda et al. | |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

SYSTEMS AND METHODS FOR EMERGENCY VEHICLE WARNINGS VIA AUGMENTED REALITY

CROSS-REFERENCE TO RELATED APPLICATIONS

This application claims priority to and the benefit of the filing dates of U.S. Patent Application No. 63/397,447 entitled "Systems and Methods for In-Vehicle Augmented Reality," filed on Aug. 12, 2022, and U.S. patent application Ser. No. 17/962,017 entitled "Systems and Methods for Emergency Vehicle Warnings Via Augmented Reality," filed on Oct. 7, 2022, the entire contents of each of which are hereby expressly incorporated herein by reference.

FIELD

The present disclosure generally relates to Augmented Reality (AR), and more particularly relates to using AR to provide additional information to occupants of vehicles.

BACKGROUND

When driving, there are many types of conditions that may pose risks to vehicle occupants. For example, in low visibility conditions the driver may be unable to see hazards and/or road signage. As a result, drivers may have reduced time to avoid the hazard or perform a maneuver leading to an increased risk of accidents. As another example, when an emergency vehicle is nearby, it may be difficult to pinpoint the relative location of the emergency vehicle by listening to the sound of the siren. Thus, the driver may become distracted while attempting to discern the location of the emergency vehicle. As yet another example, drivers typically are less able to operate vehicles safely when drowsy. Conventional techniques may have additional drawbacks as well.

SUMMARY

The systems and methods disclosed herein apply Augmented Reality (AR) technology to reduce the above-mentioned risks and others, thereby improving vehicle safety.

In one aspect, a computer-implemented method for enhanced emergency vehicle warnings via Augmented Reality (AR) may be provided. The method may be implemented via one or more local or remote processors, sensors, transceivers, servers, virtual reality headsets or AR glasses, mobile devices, wearables, and/or other electronic or electric components. In one instance, the method may include (1) obtaining, via one or more processors of an electronic device on-board a vehicle, an indication of a presence of an emergency vehicle; (2) analyzing, via the one or more processors, the indication to determine a position of the emergency vehicle relative to the vehicle; (3) determining, via the one or more processors, a field of view of an occupant of the vehicle associated with an AR viewer; and/or (4) based upon a comparison of the location of the emergency vehicle and the field of view, presenting, via the one or more processors, an alert via the AR viewer. The method may include additional, fewer, or alternate actions, including those discussed elsewhere herein.

In another aspect, a system for enhanced emergency vehicle warnings via Augmented Reality (AR) may be provided. The system includes (i) one or more processors of an electronic device on-board a vehicle; and (ii) one or more non-transitory memories storing processor-executable instructions that, when executed by the one or more processors, cause the system to (1) obtain an indication of a presence of an emergency vehicle; (2) analyze the indication to determine a position of the emergency vehicle relative to the vehicle; (3) determine a field of view of an occupant of the vehicle associated with an AR viewer; and/or (4) based upon a comparison of the location of the emergency vehicle and the field of view, present an alert via the AR viewer. The system may perform additional, less, or alternate functionality, including that discussed elsewhere herein.

In still another aspect, a non-transitory computer-readable storage medium storing computer-executable instructions may be provided. The instructions, when executed by one or more processors of an electronic device on-board a vehicle, may cause the one or more processors to (1) obtain an indication of a presence of an emergency vehicle; (2) analyze the indication to determine a position of the emergency vehicle relative to the vehicle; (3) determine a field of view of an occupant of the vehicle associated with an Augmented Reality (AR) viewer; and/or (4) based upon a comparison of the location of the emergency vehicle and the field of view, present an alert via the AR viewer. The instructions may cause the processors to perform additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
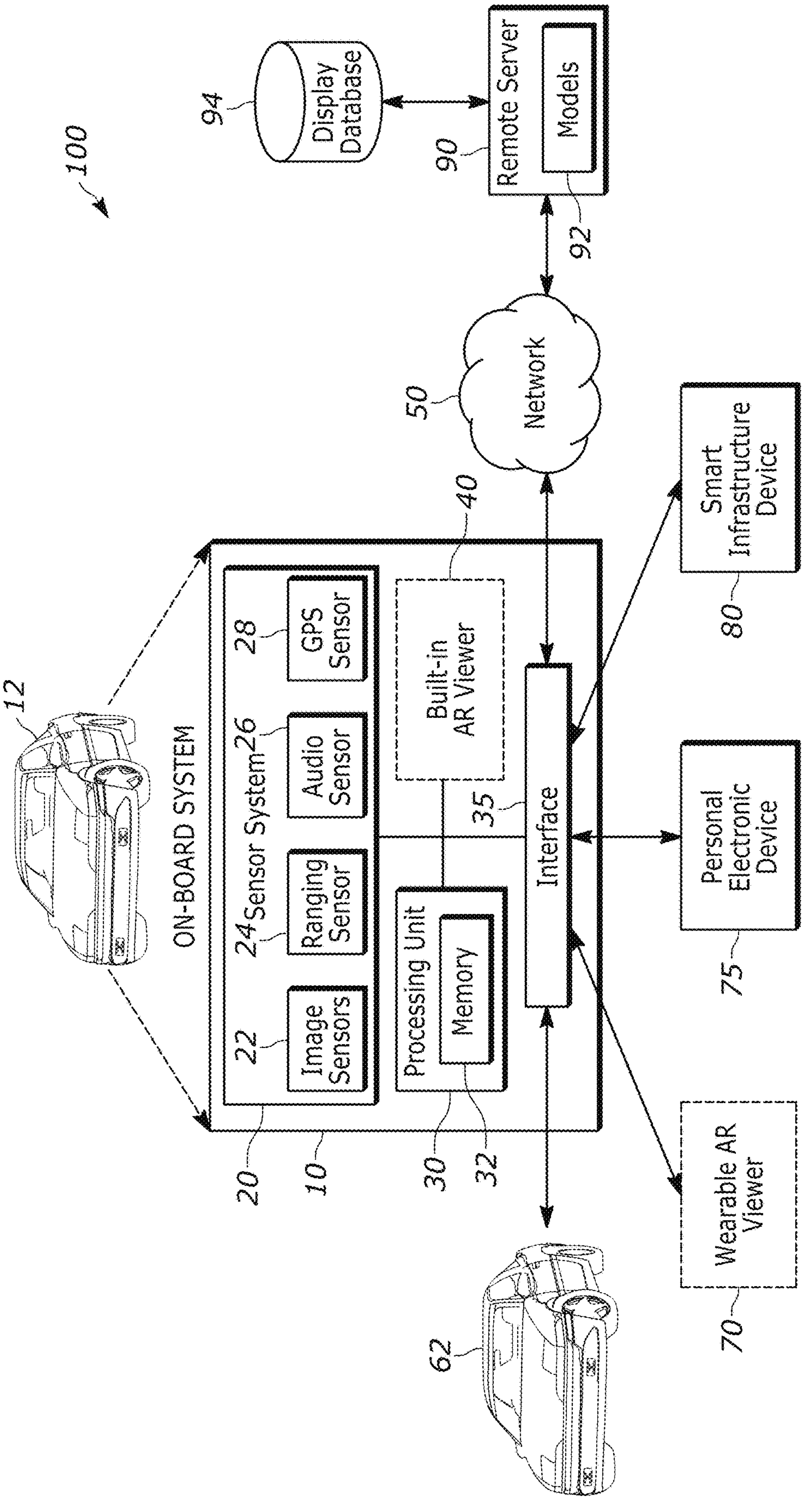
FIG. 1 shows an exemplary in-vehicle AR system.

The systems and methods disclosed herein generally relate to, inter alia, using Augmented Reality (AR) to provide additional information to vehicle occupants. While many of the techniques described herein provide additional information to a driver of the vehicle, the techniques can be adapted to provide additional information to other occupants of the vehicle. Additionally, while examples disclosed herein generally focus on cars, the techniques described herein may be implemented in any type of vehicle, such as boats, motorcycles, trains, and so on.

As used herein, the term AR should be understood to refer to the generation of a display that overlays digitally-generated information on a view of one's natural surroundings. This may include presenting a heads up display (HUD), alerts, and/or other indications of the digitally-generated information on a transparent surface of an AR viewer. In the vehicle context, the transparent surface is typically a window, windshield, or other transparent surface of the vehicle. That said, vehicle occupants may be associated with a wearable AR viewer device (e.g., glasses, contact lenses, headsets, etc.).

According to a first aspect, when operating a vehicle, a driver often lacks a complete and clear view of all available roadway information (e.g., road signs, mile markers, lane markings, etc.). For example, a large vehicle located in front of or aside the vehicle may prevent the driver from viewing the roadway information. As another example, in low-visibility conditions (e.g., darkness, fog, rain, etc.), the driver may have a reduced line of sight. Still further, some conditions are difficult to perceive (e.g., the presence of ice or a pothole) or are out of the driver's line of sight altogether (e.g., cross-traffic, vehicles obscured by natural features or buildings). Accordingly, techniques disclosed herein relate to detecting the presence of obscured information and/or hazard and providing an indication via the AR viewer to provide the otherwise unviewable information to the vehicle occupant.

According to a second aspect, the lack of perceptible information is particularly confusing when safely yielding to emergency vehicle. Often the sound of the siren reflects off of nearby buildings making it difficult to determine where the emergency vehicle is currently located and how to safely yield. As such, vehicle operators are often distracted in their attempts to discern the location of the emergency vehicle. Accordingly, techniques disclosed herein relate to automatically detecting the relative location of the emergency vehicle and providing indications via the AR viewer to enable the vehicle operator to safely yield to the emergency vehicle with fewer distractions.

According to a third aspect, outdoor displays, such as billboards, typically are operated to present messages (e.g., ads, warnings, etc.) that are relevant to multiple drivers. However, in-vehicle AR systems enable the ability to generate messages that are tailored to the individual vehicle and/or occupant thereof. As such, the messages can be adapted based on contextual information associated with the individual vehicle. For example, if the driver is tired, the AR viewer can present a message indicating a location of a nearby hotel. Accordingly, techniques disclosed herein relate to providing personalized messaging via outdoor displays to, for example, encourage safe driving practices.

Exemplary In-Vehicle Augmented Reality (AR) System

FIG. 1 illustrates a block diagram of an exemplary in-vehicle AR system 100 in which the techniques disclosed herein may be implemented. The in-vehicle AR system 100 includes an on-board system 10 of a vehicle 12. The on-board system 10 may include any on-board computing device associated with the vehicle 12. For example, the on-board system 10 may include an infotainment console, an on-board system that supports autonomous and/or semiautonomous vehicle capabilities, and/or a computing device operatively connected the vehicle via a communication port (e.g., an on-board diagnostics (OBD) port, a universal serial bus (USB) port, an Ethernet port, a direct connection to a vehicle communication bus, etc.).

The on-board system 10 may include one or processing units 30, such as one or more central processing units (CPUs), graphics processing units (GPUs), microprocessors, controllers, and/or any other suitable type of processor. The processing unit 30 include a memory 32 configured to store a set of processor-executable instructions that, when executed by the processing unit 30, implemented techniques disclosed herein. The memory 32 may be any suitable type of data storage, such as a RAM, a flash memory, or a hard drive memory, for example.

Generally, the processing unit 30 may be configured to process environmental data indicative of an environment proximate to the vehicle 12 to detect vehicle safety indicia (e.g., conditions that are pertinent to safe operation of the vehicle including obscured roadway information and/or hazards) and/or contextual data indicative of a condition of an occupant of the vehicle 12. Accordingly, the processing unit 30 may be operatively coupled to a plurality of different sources of environmental and/or contextual data. It should be appreciated that some types of data may be both environmental data and contextual data.

As a first source of environmental data, the processing unit 30 may be operatively coupled to a sensor system 20 of the vehicle 12. The processing unit 30 may be coupled to the sensor system 20 via a vehicle communication bus (e.g., a CAN bus) and/or via an intermediate perception and/or data gathering component adapted to collect and pre-process raw sensor data generated by the sensor system 20. The sensor system 20 may include any number of component sensors configured to sense different conditions. For example, the sensor system 20 may include image sensors 22 configured to capture image data.

The image sensors 22 may be any type of image sensor and include component image sensors 22 positioned to have different fields of view (FOV) with respect to the vehicle 12. For example, the image sensors 22 may include a first image sensor positioned to have a FOV extending outwards from the front of the vehicle 12, a second image sensor positioned to have a FOV extending outwards from a side of the vehicle 12, a third image sensor positioned to have a FOV inside the vehicle 12 (e.g., directed towards an occupant of the vehicle 12), and so on.

The sensor system 20 may also include one or more ranging sensor 24, such as the light detection and ranging (LIDAR) sensors or radar sensors. The ranging sensors 24 may enable the processing unit 30 to detect the presence and/or relative position of objects in the vehicle environment, even in low visibility conditions. Additionally, the ranging sensors 24 may enable the processing unit 30 to determine a relative speed of the object with respect to the vehicle 12.

As illustrated, the sensor system 20 may also include an audio sensor 26, such as a microphone. The audio sensor 26 may be configured to capture audio data indicative of the sound inside the vehicle 12. For example, the audio sensor 26 may be configured to capture speech data from an occupant of the vehicle 12 to enable natural language processing thereof.

Additionally, the sensor system 20 may include a GPS sensor 28 configured to determine a position of the vehicle 12. The processing unit 30 may use the GPS data to query one or more databases to obtain the environmental data. For example, the processing unit 30 may use the GPS data to query a mapping database to determine mapping information (e.g., roadway information such as the location of cross streets, turn offs, exits, road signage, lane information, etc.). As another example the processing unit 30 may use the GPS data to query a database of outdoor displays to determine the relative position of one or more outdoor displays that may be overlaid with AR data.

It should be appreciated that the sensor system 20 may also include other sensors not depicted by FIG. 1. For example, the sensor system 20 may include accelerometers, light sensors, precipitation sensors, proximity sensors, seat pressure sensors, and/or other sensors configured to sense the environment associated with the vehicle 12.

In addition to the sensor system 20 of the vehicle 12, the processing unit 30 may be configured to obtain environmental data and/or contextual data from sources external to the on-board system 10. Accordingly, the on-board system 10 may include a communication interface 35 via which the processing unit 30 is communicatively coupled to an external device. It should be appreciated that the interface 35 may include component interfaces that enable the on-board system 10 to communicate via different communication protocols. For example, the interface 35 may include one or more transceivers adapted to establish a short-range communication coupling (e.g., a Bluetooth connection, a Wi-Fi direct connection, a vehicle-to-vehicle (V2V) connection) with one or more devices located proximate to the vehicle 12 and/or one or more transceivers adapted to establish a long-range communication coupling (e.g., a satellite connection, a cellular connection (including LTE, New Radio, and/or 6G connections), and so on) with devices located remote from the vehicle 12 (e.g., a remote server). Additionally, the interface 35 may include photodetectors and/or light emitting diodes (LEDs) to support visual light communication (VLC) connections.

As a first source of external environmental data, the on-board system 10 may establish a V2V connection with a second vehicle 62. Accordingly, the environmental data may be generated by a sensor system of the second vehicle 62 and received via the V2V connection at the interface 35. In some embodiments, the processing unit 30 may analyze sensor data captured by the sensor system 20 to initiate the V2V connection with the vehicle 62 and/or the transmission of the environmental data thereby. For example, the processing unit 30 may analyze the data generated by the image sensors 22 and/or the ranging sensors 24 to determine that a large vehicle, such a semi-truck is positioned in front or to the side of the vehicle 12.

Accordingly, the processing unit 30 may initiate a request to obtain image data generated by a sensor system of the vehicle 62. For example, the processing unit 30 may analyze the obtained image data to detect vehicle safety indicia in front of or on the opposite side of the vehicle 62 that are obscured from view to occupants of the vehicle 12 by the vehicle 62 itself. As another example, the processing unit 30 may establish a V2V connection with the vehicle 62 to obtain heading information (e.g., a speed, a direction of travel, a navigation routine being autonomously implemented) associated with the vehicle 62.

As another source of external environmental data, the on-board system 10 may establish a communicative coupling with a smart infrastructure device 80. In some embodiments, the smart infrastructure device 80 may be configured to support V2V communication protocols. Additionally or alternatively, the smart infrastructure device 80 may be configured to establish a VLC coupling via photodetectors included in the interface 35. For example, the smart infrastructure device 80 may be a street light or a traffic light configured to modulated the emitted light in a pattern not perceptible to humans. More particularly, a traffic light equipped with an emergency vehicle indicator may be configured to communicate additional details regarding the presence of emergency vehicles when initiated. That is, in addition to simply activating the emergency vehicle indication LED, the smart infrastructure device 80 may be configured to modulate the emergency vehicle indication LED to embed emergency vehicle information (e.g., vehicle type, vehicle position, vehicle proximity, vehicle route information, etc.) using a VLC protocol.

Additionally or alternatively, the smart infrastructure device 80 may include light emitting components adapted to emit light at wavelengths not perceptible to humans (e.g., infrared or ultraviolet light). Accordingly, in response to the smart infrastructure device 80 being activated to provide an emergency vehicle alert, the smart infrastructure device 80 may be configured to emit one or more beams of light. For example, the smart infrastructure device 80 may emit a first beam of light at a first wavelength to indicate a current position of the emergency vehicle and a second beam of light a second wavelength to indicate an expected route of travel for the emergency vehicle as it passes the smart infrastructure device 80. Accordingly, in these embodiments, the photodetectors of the interface 35 may be tuned to detect the non-visible wavelengths emitted by the smart infrastructure device 80.

As a third source of external environmental and/or contextual data, the on-board system 10 may be communicatively coupled to a personal electronic device 75 associated with the occupant of the vehicle 12. The personal electronic device 75 may be a smart phone, a tablet, a smart wearable, a laptop, or any other type of personal electronic device. Accordingly, the interface 35 may include Bluetooth transceivers, a USB transceiver, and/or other transceivers configured to communicatively couple the on-board system 10 with various types of personal electronic device 75.

In some embodiments, the personal electronic device 75 is configured to execute a navigation application. In these embodiments, the on-board device 10 may be configured to receive navigational data from the personal electronic device 75 via the interface 35. Additionally or alternatively, the personal electronic device 75 may be configured to execute a personal assistant application. Accordingly, the on-board device 10 may be configured contextual data based upon user interactions with the personal assistant application from the personal electronic device 75 via the interface 35.

As a still further source of external environmental data, the on-board system 10 may be configured to detect the presence of one or more beacon devices (not depicted), such as AR beacons, Bluetooth beacons, and so on. These beacon devices may be configured to report location information to nearby devices, such as the on-board system 10, such that the nearby devices are aware of their presence. For example, motorcyclists may dispose a beacon device on their motorcycle or a pet owner may dispose a beacon in a pet collar such that the on-board system 10 is able to detect a beacon signal emitted therefrom. Accordingly, the on-board system 10 may be configured to receive environmental data broadcast by the beacon devices and sensed via the interface 35 and/or the sensor system 20.

Regardless of the source, the processing unit 30 may be configured to analyze the environmental and/or contextual data to present an AR display via an AR viewer. In some embodiments, the AR viewer is a built-in AR viewer 40 that is integrated into a transparent surface of the vehicle 12. For example, the built-in AR viewer 40 may be integrated into a front windshield, a side window, a rear window, a rear-view mirror, a side mirror, and so on. Alternatively, the AR viewer may be a wearable AR viewer 70 worn by the vehicle occupant, such as AR glasses, AR contact lenses, an AR headset, and so on.

With respect to the environmental data, the processing unit 30 may be configured to analyze the environmental data to detect the presence of vehicle safety indicia and/or the relative position of the vehicle safety indicia. In some embodiments, the processing unit 30 may be configured to correlate image data generated by the image sensors 22 with ranging data generated by the ranging sensors 24 to determine the relative position of the vehicle safety indicia. As another example, the on-board system may be configured to receive position data from the vehicle 62, the smart infrastructure device 80, and/or a beacon device to determine the relative position.

With respect to the contextual data, the processing unit 30 may be configured to determine a relative location of an outdoor display. For example, the on-board system 10 may be coupled to a remote server 90 via one or more communication networks 50 (e.g., a satellite network, a cellular network (including LTE, New Radio, and/or 6G networks) and so on). The remote server 90 may maintain an outdoor display database 94 that indicates a location of outdoor displays compatible with the disclosed AR techniques. For example, the outdoor displays may be a generic white or green billboard on which an AR display generated by the on-board system 10 can be overlaid. Accordingly, the on-board system 10 may be configured to compare GPS data generated by the GPS sensor 28 to the location of outdoor displays maintained in the database 94 to determine the relative location of a display.

In some embodiments, the on-board system 10 transmits a portion of the contextual data to the remote server 90 for further processing. To this end, the server 90 may have substantially more processing power than the on-board system 10 and, as such, may be able to execute analysis models 92 more efficiently than the on-board system 10. For example, a model 92 may be a natural language processing (NLP) model configured to process transcribed audio data captured by the audio sensors 26. In particular, the NLP model may be configured to identify a subject (e.g., an object, a topic, a person, a location, etc.) related to the contextual data. As another example, a model 92 may be sentiment analysis model configured to process image data, audio data, and/or text to determine a sentiment (e.g., happy, sleepy, nervous, distracted, etc.) associated with an occupant of the vehicle 12. The server 90 may then use one or more outputs from the models 92 to identify an image to present via an AR overlay on an outdoor display.

Figure 2B:
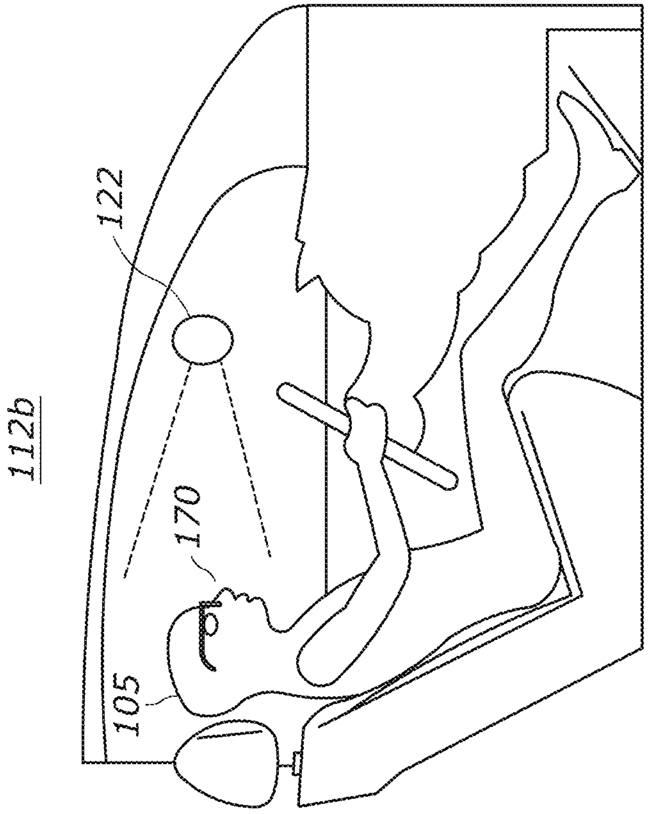
FIG. 2B illustrates an exemplary AR system that includes a wearable AR viewer.
Figure 2A:
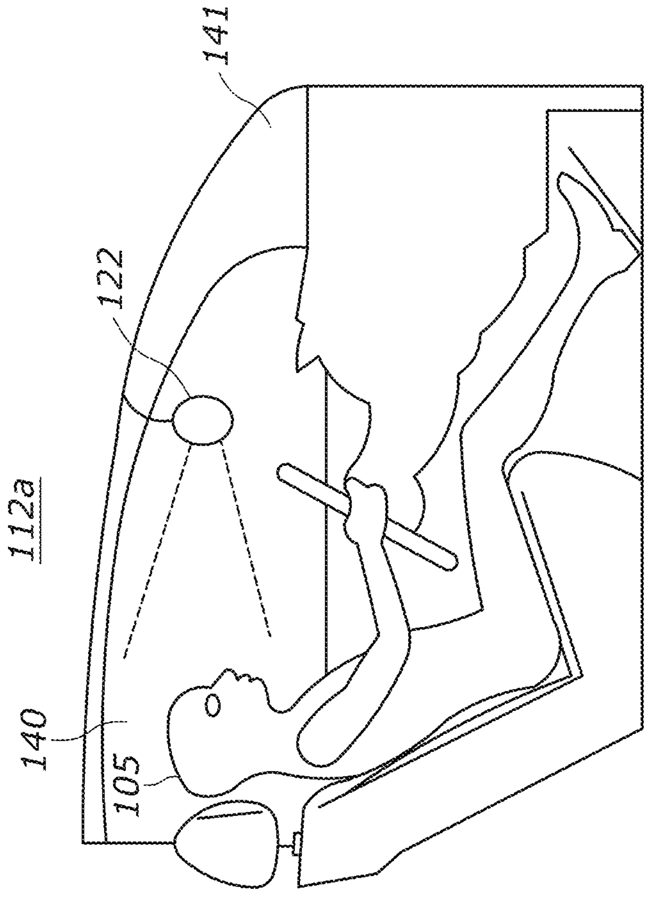
FIG. 2A illustrates an exemplary AR system that includes a built-in AR viewer.

To ensure that the AR overlay correctly overlays the vehicle safety indicia and/or the image on an outdoor display, the on-board system 10 may also be configured to determine a field of view associated with the occupant. With simultaneous reference to FIGS. 2A and 2B, illustrated is a perspective view of an occupant 105 operating a vehicle 112 (such as the vehicle 12 of FIG. 1). More particularly, FIG. 2A illustrates a perspective view of a vehicle 112*a* equipped with a side window built-in AR viewer 140 and a front windshield built-in AR viewer 141 (either of which may be the built-in AR viewer 40 of FIG. 1) and FIG. 2B illustrates a perspective view of a vehicle 112*b* in which the occupant 105 is wearing a wearable AR viewer 170 (such as the wearable AR viewer 70 of FIG. 1).

Starting with the scenario in FIG. 2A, an image sensor 122 (such as an image sensor 22 of FIG. 1) is disposed in a rearview mirror and positioned to have a field of view directed inwards towards the occupant 105. The on-board system 10 may obtain image data from the image sensor 122 and analyze the image data to detect the eyes of the occupant 105. The on-board system 10 may then compare the detected location of the eyes to a known position and/or orientation of the image sensor 122 to determine the location of eyes of the occupant 105. This location may serve as the origin for the field of view. It should be appreciated if the occupant 105 is turned to the side, the on-board system 10 may analyze other characteristics of the occupant 105 (such as the cars, neck, and so on) to estimate a location of the eyes. The on-board system 10 may then analyze the image data indicative of the eyes further to detect an orientation of the gaze of the occupant 105.

The on-board system 10 may then project the field of view of the occupant 105 in the direction of the gaze towards the AR viewers 140, 141 to determine whether the relative position of a vehicle safety indicia falls within the determined field of view. If so, the on-board system 10 then generates an AR display that overlays the vehicle safety indicia at a position based upon the field of view of the occupant 105. It should be appreciated that the on-board system 10 may generate indications on both the AR viewer 140 and 141.

Turning to FIG. 2B, the on-board system 10 may still be configured to determine the position of the occupant 105 via the image sensors 122. If the eyes of the occupant are visible, the on-board system 10 may detect the position of the eyes in image data generated by the image sensors 122. Additionally or alternatively, the on-board system 10 may be configured to detect image data indicative of the wearable AR viewer 170 itself. Because most AR viewer devices include an orientation sensor (such as a gyroscope and/or an accelerometer), the AR viewer device 170 may be able to determine the orientation of the gaze of the occupant 105 with more accuracy than via image analysis. Accordingly, in these embodiments, the on-board system 10 may be configured to receive orientation data from the wearable AR viewer 170 to determine the field of view of the occupant 105.

It should be appreciated that because the transparent screen of the AR viewer 170 is positioned closer to the eyes of the occupant 105 than the built-in AR viewers 140, 141. As such, when generating an AR display, the on-board system 10 may determine an AR viewer type and scale the indications of the vehicle safety indicia to account for the different relative positions of the transparent surfaces with respect to the occupant 105 and/or the vehicle safety indicia.

Returning to FIG. 1, the on-board system 10 may also determine a position of the vehicle 12 with respect to a lane. To this end, GPS data does not have sufficient accuracy to determine an exact position of the vehicle 12 within a lane of the road. Accordingly, the on-board system 10 may be configured to analyze image data from the image sensors 22 and/or data generated by the ranging sensors 24 to determine a position of the vehicle 12 within a lane of the road. This enables the on-board system 10 to more accurately overlay some indications of vehicle safety indicia, such as lane markings.

Generating AR Displays of Vehicle Safety Indicia

Turning now to FIGS. 3-6, illustrated are exemplary AR displays configured to present indications of different types of vehicle safety indicia. The AR displays may be generated by an on-board system (such as the on-board system 10 of FIG. 1) based on analysis of environmental data. It should be appreciated that while FIGS. 3-6 illustrate AR displays presented on an AR viewer built-into a front windshield (such as the AR viewer 141 of FIG. 2A), the techniques disclosed herein may be adapted to present similar AR displays on other AR viewer devices (such as the wearable AR viewers 70, 170 of FIGS. 1, 2B, respectively, the AR viewer built-into a side window 140 of FIG. 2A, and/or other types of built-in AR viewers 40 of FIG. 1). It should be appreciated that the example AR displays illustrated herein are merely exemplary, and alternative AR displays may include additional, fewer, and/or alternative indications of the vehicle safety indicia.

Figure 3:
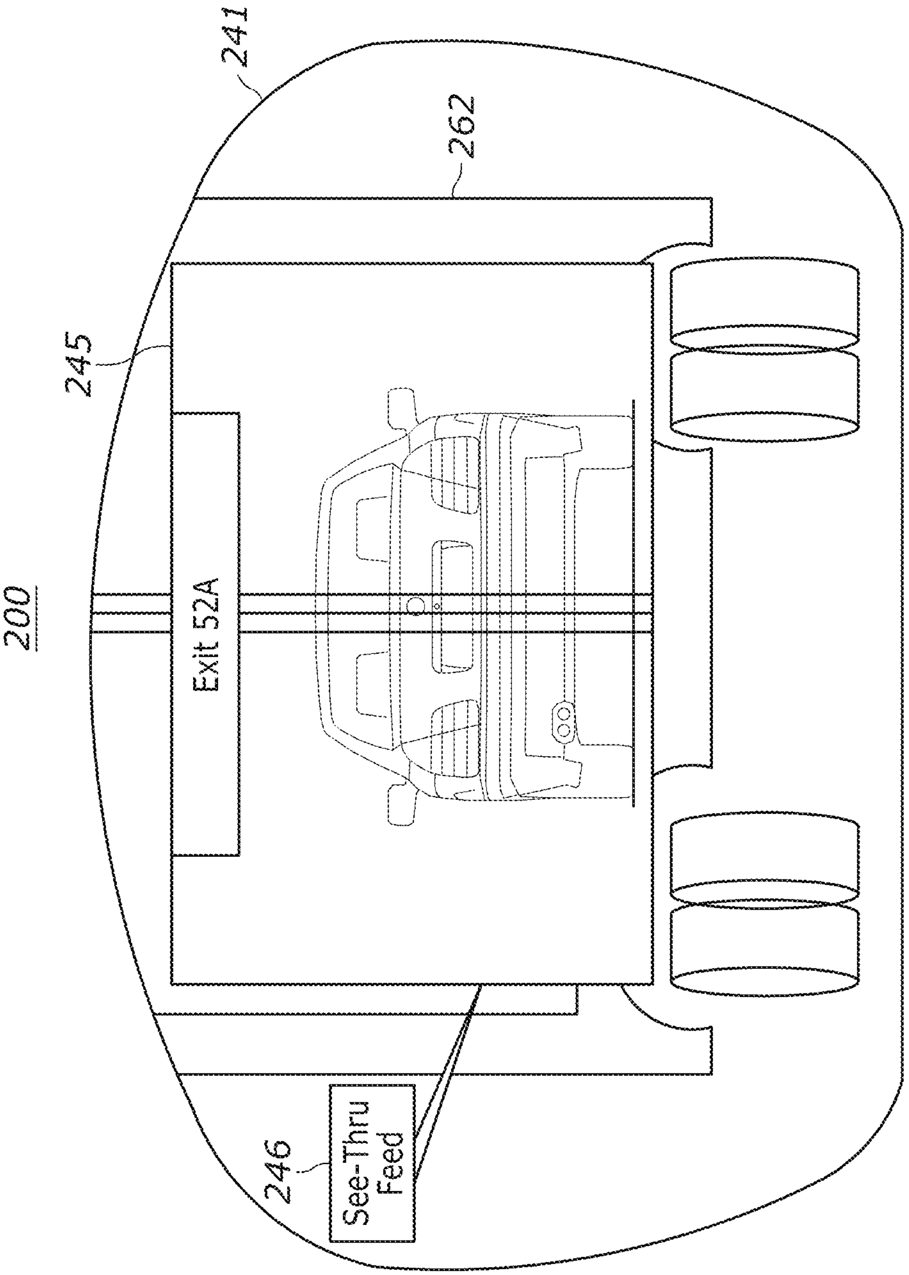
FIG. 3 illustrates an exemplary AR display that includes image data from another vehicle.

Starting with FIG. 3, illustrated is an exemplary AR display 200 presented by an AR viewer built-into a windshield 241 (such as the AR viewer 141 of FIG. 2A). In the illustrated scenario, the vehicle that includes the on-board system is behind a vehicle 262 that is obstructing a view of the road. In this scenario, the on-board system may attempt to establish a V2V connection with the vehicle 262. If the on-board system is able to successfully pair with an on-board system of the vehicle 262, the on-board system may request environmental data from the vehicle 262. For example, the on-board system may request image data (including video data) of generated by image sensors oriented in front of the vehicle 262. It should be appreciated that if the vehicle 262 were positioned beside the vehicle blocking a side view, the on-board system may instead request image data of a side of the vehicle 262 opposite of the vehicle.

The on-board system may then generate the AR display 200 in a manner that includes the image data generated by the image sensors of the vehicle 262. In the illustrated AR display 200, the image data 245 is presented as a video feed overlaid upon the vehicle 262 itself. For example, the video feed 245 may reveal the presence of a vehicle in front of the vehicle 262 and/or signage obscured by the vehicle 262. This enables the occupant of the vehicle to have more information while driving than conventionally possible, empowering the occupant to make safer decisions while driving.

In some embodiments, to avoid confusing the occupant, the video feed 245 may be presented in a transparent manner such that the occupant is still able to view the vehicle 262. Additionally, the on-board system may configure the AR display 200 to include an indicator 246 that labeling the video feed 245.

It should be appreciated that the back of a large vehicle is a good surface for presenting other indications of vehicle safety indicia that may be obscured by the vehicle 262. For example, if the vehicle 262 does not include image sensors or V2V capabilities, the on-board system may query a mapping database to identify upcoming events associated with the roadway (e.g., exits, cross streets, on-ramps, etc.) and generate AR indications of the roadway events on back of the vehicle 262 to ensure the occupant is provided sufficient notice to safely maneuver in response to the upcoming roadway event.

As another example, if the vehicle 262 includes a ranging sensor but not an imaging sensor, the on-board system may request indications in response to the presence of a vehicle proximate to the vehicle 262. In response to receiving such an indication, the on-board system may present an AR indication alerting the occupant to the presence of the vehicle in front of the vehicle 262.

Figure 4:
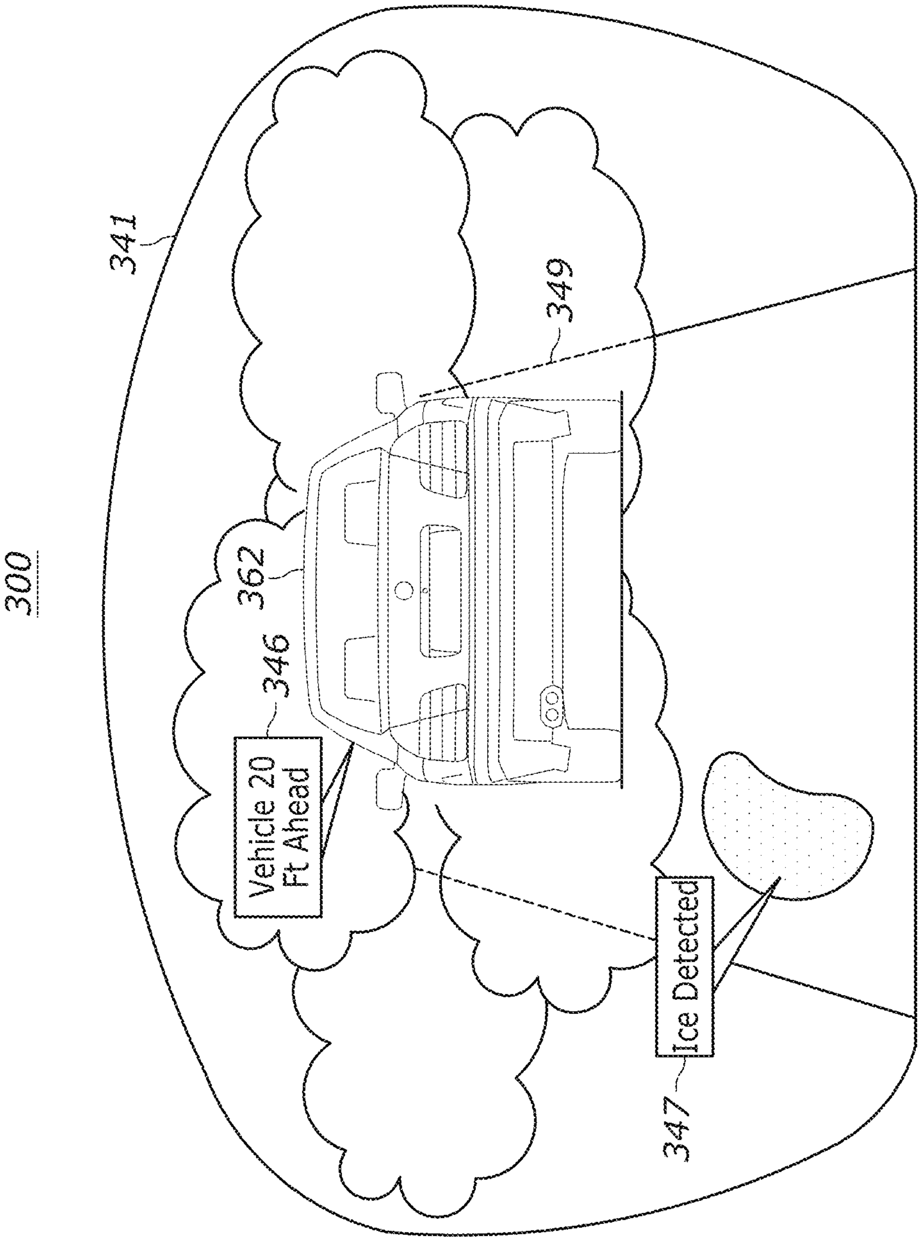
FIG. 4 illustrates an exemplary AR display that includes indications of vehicle safety indicia in a low-visibility environment.

Turning now to FIG. 4, illustrated is an exemplary AR display 300 presented by an AR viewer built-into a windshield 341 (such as the AR viewers 141, 241 of FIGS. 2A and 3, respectively). In the illustrated scenario, the vehicle that includes the on-board system detects that the vehicle is located in a foggy environment, for example, based on analysis of image data, LIDAR data, and/or a fog detection sensor of the vehicle.

Accordingly, the vehicle may attempt to establish V2V communications with nearby vehicles to detect the presence of any vehicle obscured by the fog. In the illustrated scenario, a vehicle 362 is located in front of the vehicle and respond to the V2V broadcast emitted by the vehicle. Using the V2V coupling the vehicle may request information from the vehicle 362, such as position data, speed data, vehicle type, and/or other types of telematics data. Based on the received information, the on-board system may configure the AR display 300 to include an indication of the vehicle 362. For example, the on-board system may generate a virtual representation of the vehicle 362 based upon the relative position of the vehicle 362. In some embodiments, the virtual representation may be further configured based on the vehicle type data such that the virtual representation reflects the indicated vehicle type.

In some embodiments, the vehicle 362 may not support V2V communication. Accordingly, the on-board system may be configured to detect the presence of the vehicle 362 via a ranging sensor. In these embodiments, the on-board system may be able to determine the distance to the vehicle 362 via the ranging data. Regardless of how the presence of the vehicle 362 is detected, the on-board system may configure the AR display 300 to include a notification 346 that indicates the presence of the vehicle 362 (and/or virtual representation thereof). The notification may include additional information, such as relative distance to the vehicle 362 and a speed of the vehicle 362.

As illustrated, the on-board system may configure the AR display to present other indications of vehicle safety indicia. For example, if on-board system determines that the environmental data indicates a patch of ice on the road, the on-board system may generate an AR indication 347 alerting the occupant to the presence of the ice. In some embodiments, the on-board system may configure the AR display 300 highlight or otherwise emphasize the exact location of the ice patch. As yet another type of vehicle safety indicia, the on-board system may configure the AR display 300 to include AR indications 349 of lane markers obscured by the fog. It should be appreciated that while the illustrated AR indication 349 is a straight line, if mapping data indicates that the road has a turn ahead, then the on-board system may configure the AR display 300 to adhere to upcoming path of the road.

Figure 5:
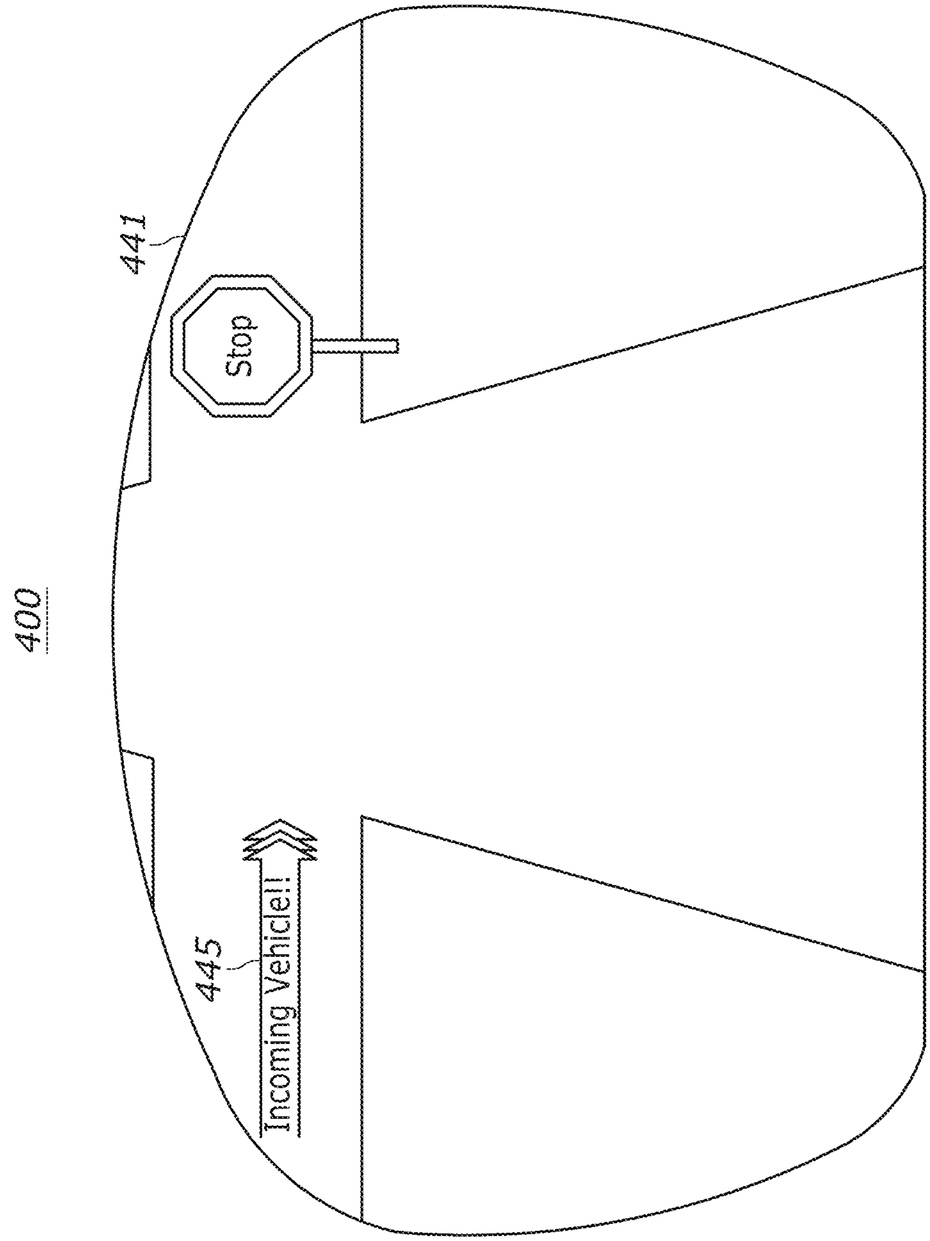
FIG. 5 illustrates an exemplary AR display that includes an alert about an obscured hazard.

Turning now to FIG. 5, illustrated is an exemplary AR display 400 presented by an AR viewer built-into a windshield 441 (such as the AR viewers 141, 241, 341 of FIGS. 2A, 3, and 4, respectively). In the illustrated scenario, the vehicle is approaching an intersection where traffic along the cross street is obscured, for example, by a building or a row of parked cars.

To the detect the presence of the vehicle along the cross street, the on-board system may be configured to establish V2V communications with vehicles proximate to the vehicle. Accordingly, if a V2V communication link is established with a vehicle approaching on the cross street, the on-board system may configure the AR display 400 to include an indication 445 alerting the occupant of the vehicle as to the presence of the vehicle on the cross street.

Figure 6:
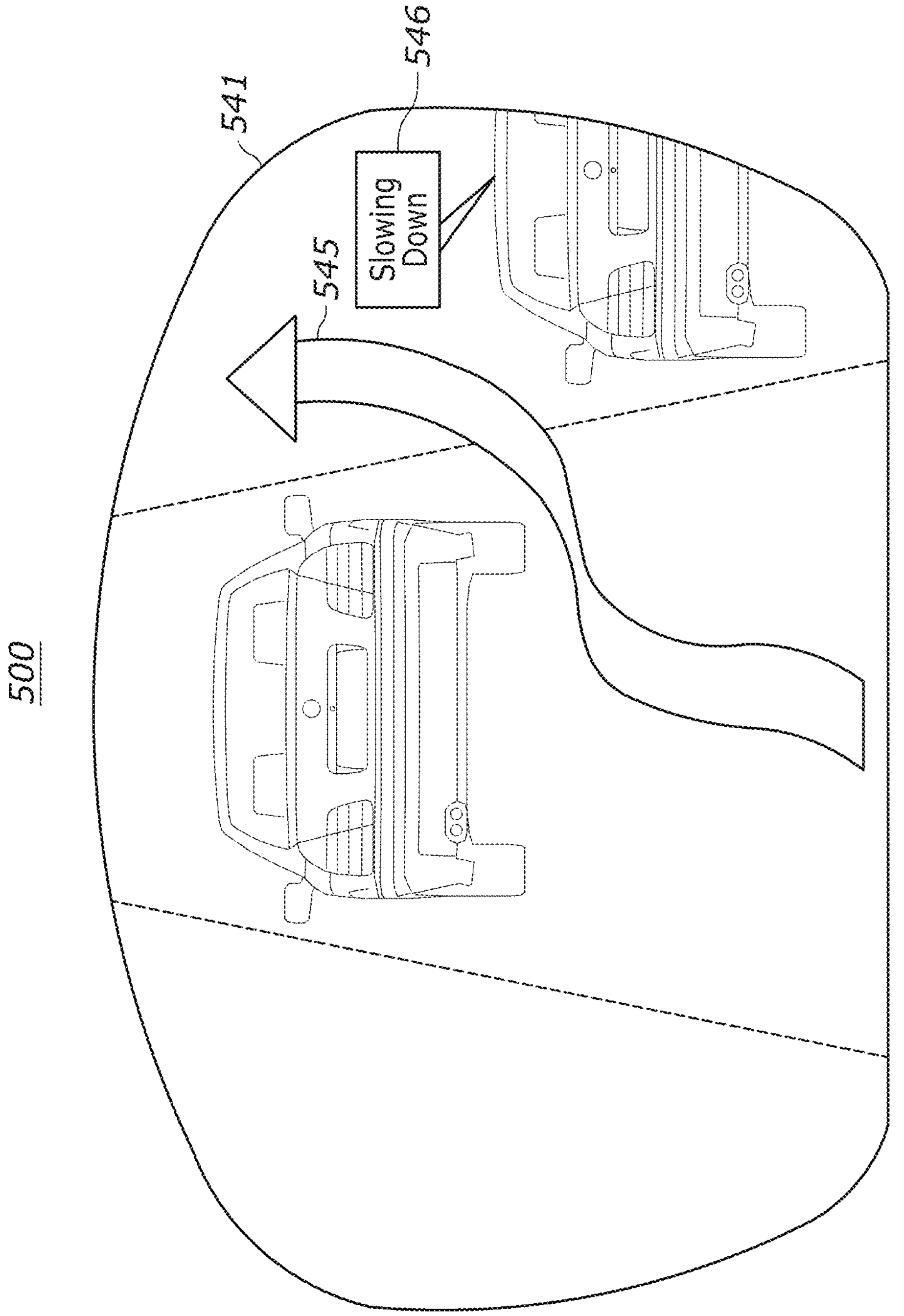
FIG. 6 illustrates an exemplary AR display that includes navigational guidance.

Turning now to FIG. 6, illustrated is an exemplary AR display 500 presented by an AR viewer built-into a windshield 541 (such as the AR viewers 141, 241, 341, 441 of FIGS. 2A, 3, and 4, respectively). In the illustrated scenario, the on-board system is providing navigational guidance based upon the obtained environmental data. As described above, the on-board system may obtain the environmental data via V2V communication, image sensors, ranging sensors, and/or a mapping application.

In the illustrated scenario, the mapping application may be executing a navigation routine to that is guiding the occupant to a destination. Accordingly, the mapping application may determine that the occupant should enter the right lane to be in position for an upcoming exit. The on-board system may be configured to analyze the environmental data to detect an opportunity to safely change lanes, for example, based upon a relative position and/or a speed of the vehicles proximate to the vehicle. For example, if, as illustrated, the on-board system determines that a car in the right lane is slowing down (relative to the vehicle), the on-board system may determine that there is an opportunity to change lanes into the right lane upon passing the car.

As such, the on-board system may configure the AR display 500 to include an AR indication 545 indicating a route to change lanes and/or an AR indication 546 indicating a condition of other vehicles that provides the opportunity to change lanes and/or a predicted trajectory of the other vehicles. It should be appreciated that the on-board system may configure an AR display to present similar navigational assistance to avoid other types of vehicle safety indicia, such as ice patches, potholes, obscured vehicles, and/or objects (such as motorcycle, pets, or pedestrians) associated with a beacon device.

Figure 7:
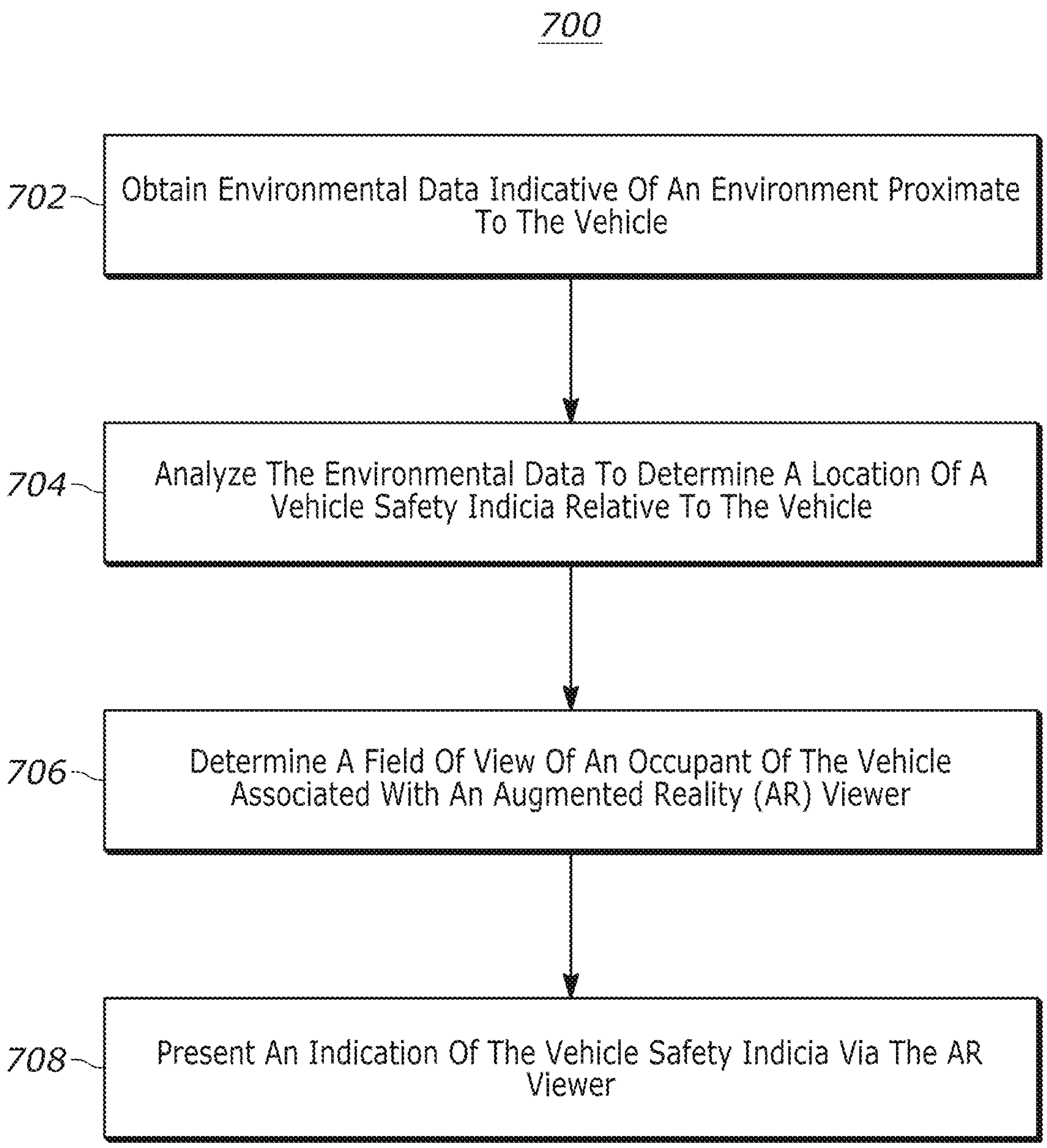
FIG. 7 illustrates a block diagram of an exemplary computer-implemented method for improving vehicle safety via AR, in accordance with embodiments disclosed herein.

Turning now to FIG. 7, illustrated is an exemplary computer-implemented method 700 for improving vehicle safety via AR. The method 700 may be performed by an electronic device, e.g., a processing unit (such as the processing unit 30 of FIG. 1) of an on-board system (such as the on-board system 10 of FIG. 1) of a vehicle (such as the vehicles 112 of FIGS. 1, 2A, and 2B).

The method 700 may begin when the electronic device obtains environmental data indicative of an environment proximate to the vehicle (block 702). In some embodiments, the electronic device is operatively coupled to a sensor system of the vehicle. Accordingly, the environmental data may include at least one of image data or light detection and ranging (LIDAR) data generated via the sensor system of the vehicle. In these embodiments, the electronic device may determine a distance between the vehicle and the vehicle safety indicia based upon the environmental data and scale a size of the indication of the vehicle safety indicia based upon the determined distance.

In some embodiments, the electronic device obtains the environmental data by receiving, from an electronic device on-board a second vehicle, the environmental data. In these embodiments, the environmental data may include at least one of (i) image data or light detection and ranging (LIDAR) data generated via a sensor system of the second vehicle, (ii) position data of the second vehicle, and (iii) telematics data generated by the sensor system of the second vehicle.

In some embodiments, the electronic device obtains the environmental data by detecting a communication signal emitted by a beacon device. In these embodiments, the communication signal may include an indication of the vehicle safety indicia. Additionally or alternatively, the electronic device may obtain the environmental data by obtaining mapping data from a mapping service provider.

At block 704, the electronic device analyzes the environmental data to determine a location of the vehicle safety indicia relative to the vehicle. For example, the electronic device may obtain ranging data from a ranging sensor (such as the ranging sensor 24 of FIG. 1) and/or positioning data from another vehicle via a V2V communication link.

At block 706, the electronic device determines a field of view of an occupant of the vehicle associated with an Augmented Reality (AR) viewer. In some embodiments, the AR viewer is a built-in AR viewer (such as the AR viewers, 40, 140, 141, 241, 341, 441, 541), which may be at least one of a smart windshield, a smart window, or a smart mirror of the vehicle. In other embodiments, the AR viewer is a wearable AR viewer (such as the AR viewers 70, 170). In these embodiments, the electronic device may obtain orientation data from the AR viewer to assist in determining the field of view. In either case, to determine the field of view, the electronic device may be configured to obtain image data generated by an image sensor configured to have a field of view oriented within the vehicle (such as the image sensor 122 of FIGS. 2A, 2B) and, based upon the image data, determine a location of the occupant within the vehicle.

At block 708, the electronic device presents an indication of the vehicle safety indicia via the AR viewer based upon a comparison of the location of the vehicle safety indicia and the field of view. In embodiments where the environmental data includes data obtained from a second vehicle, the electronic device may present the image data generated by the second vehicle. In some embodiments, the electronic device may determine, based upon telematics received from the second vehicle, a trajectory of the second vehicle and present an indication of the trajectory of the second vehicle.

In some embodiments, the electronic device analyzes, the environmental data to detect at least one of (i) the environment being a low-visibility environment, or (ii) a presence of an obscured hazard. In these embodiments, the vehicle safety indicia may be at least one of a presence of ice, a vehicle, a road marking, a road sign, a pot hole, and a pedestrian. Accordingly, the electronic device may determine a maneuver that indicates safe operation of the vehicle in view of the vehicle safety indicia and present an indication of the maneuver via the AR viewer. In some embodiments, the electronic device may also be configured to obtain navigation instructions associated with the vehicle and present an indication of a navigation instruction via the AR viewer. The method may include additional, fewer, or alternate actions, including those discussed elsewhere herein.

Emergency Vehicle AR Techniques

As described above, when a vehicle operator hears a siren from an emergency vehicle, the vehicle operator often becomes distracted in an effort to identify the source of the siren and an appropriate maneuver to perform in order to yield to the emergency vehicle. Accordingly, techniques disclosed herein relate to using AR technology to improve how vehicle operators are notified as to the presence of an emergency vehicle, thereby reducing the likelihood of an accident occurring and/or allowing the emergency vehicle to more safely arrive at its destination.

Figure 8:
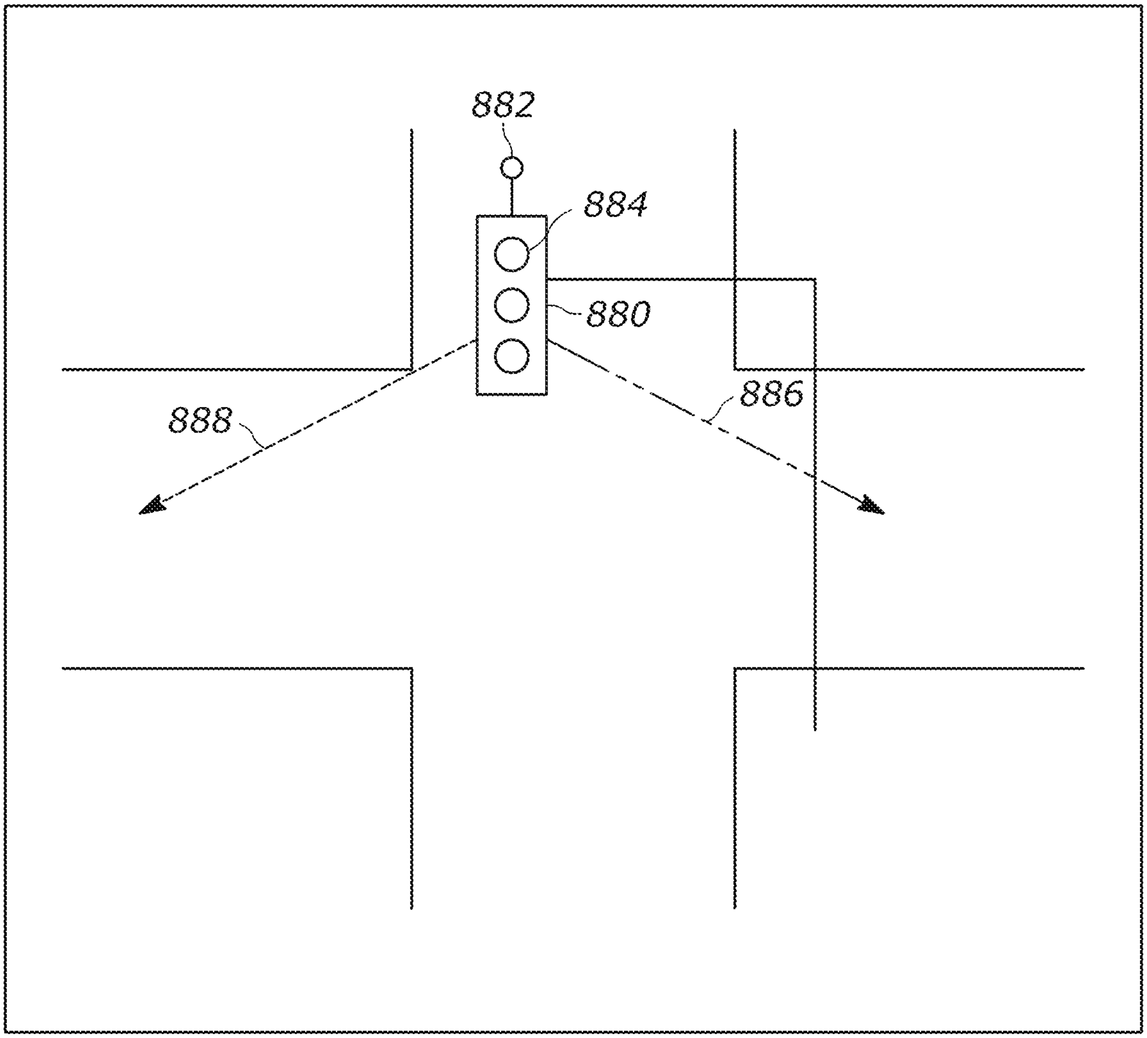
FIG. 8 illustrates an exemplary smart infrastructure device configured to provide indications related to emergency vehicles.

Starting with FIG. 8, illustrated is an exemplary smart infrastructure device 880 configured to signal the presence of an emergency vehicle using visual light communication (VLC) techniques. In the illustrated example, the smart infrastructure device 880 is a traffic light, though the smart infrastructure device 880 may take other form factors in other embodiments. For example, the smart infrastructure device 880 may also be a streetlight, an electronic street sign, or even a dedicated emergency vehicle signaling device.

The smart infrastructure device 880 may be configured to receive an indication of the presence of the emergency vehicle and signally communicate the presence to other vehicles using VLC. For example, the smart infrastructure device 880 may be communicative coupled to the emergency vehicle (such as via a V2V communication link) and/or a server associated with a central response unit (e.g., a 9-1-1 response center) associated with the emergency vehicle. The indication may include an indication of the emergency vehicle's current location, a heading for the emergency vehicle, and/or a destination for the emergency vehicle.

In response to receiving the indication, the smart infrastructure device 880 may configure a light source to emit light in accordance with a VLC protocol (such as the Li-Fi protocol or other protocols developed by standard setting bodies). It should be appreciated that most VLC protocols encode the communicated information by modulating the emission faster than humans can perceive. As a result, a light emitting diode (LED) used to provide conventional traffic signals can be modified to additionally provide VLC signals without disrupting the normal operation of the smart infrastructure device 880. In the instant traffic light embodiment, the smart infrastructure device 880 may encode the VLC signals using a dedicated emergency vehicle warning light 882 and/or one of the traffic signal lights 884. As a result, if a vehicle includes a photosensor within a line-of-sight of the lights 882, 884, an on-board system coupled to the photosensor may be able to decode the VLC signals to determine information about the presence of the emergency vehicle.

Additionally or alternatively, the smart infrastructure device 880 may include additional light sources that enable the smart infrastructure device 880 to signal information about the emergency vehicle without the use of VLC communications. To this end, the smart infrastructure device 880 may include one or more laser light sources configured to emit light having wavelengths outside of the visible spectrum. Accordingly, in response to detecting the indication regarding the presence of the emergency vehicle, the smart infrastructure device 880 may configure a laser light source to emit light 886 in a direction towards a current location of the emergency vehicle. In scenarios where the emergency vehicle is not currently on a straight line along a road associated with the smart infrastructure device 880, the smart infrastructure device 880 may emit the light 886 in a direction at which the emergency vehicle will arrive at a location associated with the smart infrastructure device 880.

A photodetector of an on-board system may then detect the light 886 to determine the direction at which the emergency vehicle will arrive at the smart infrastructure device 880. The on-board system may then compare the determined direction to a current location of the vehicle to provide a notice to the occupant as to the relative location of the emergency vehicle.

In some embodiments, the smart infrastructure device 880 may also configure a second light source (or modify operation of the first light source) to emit light 888 in the direction the emergency vehicle will be travelling after passing the smart infrastructure device 880. In these embodiments, the smart infrastructure device 880 may configure the light 886 and light 888 to use different wavelengths. As such, the photodetector may include filters at both wavelengths such that the on-board system is able to distinguish between the light 886 and light 888.

Figure 9:
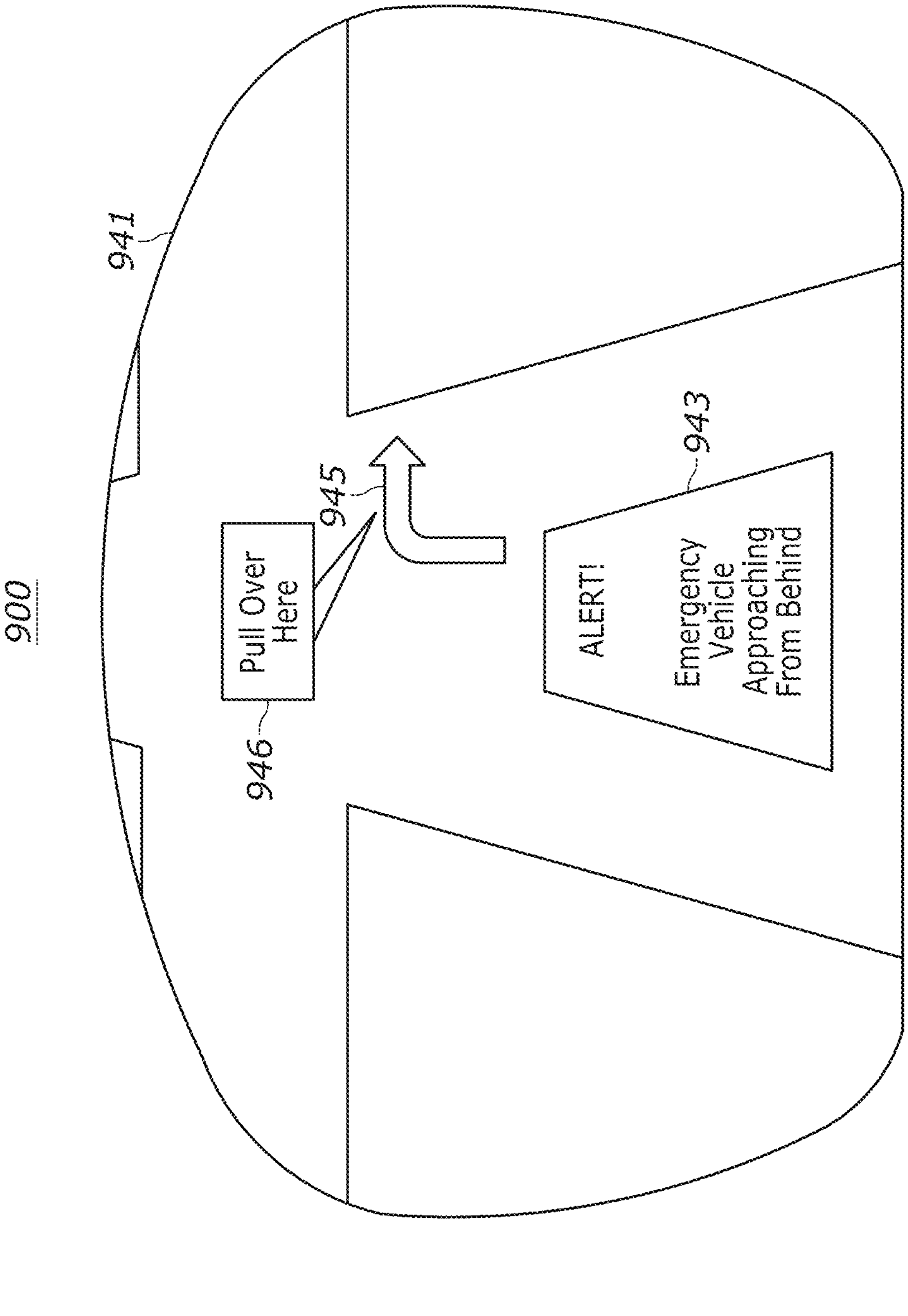
FIG. 9 illustrates an exemplary AR display that includes an alert related to an emergency vehicle.

Turning now to FIG. 9, illustrated is an exemplary AR display 900 configured to present an indication of an emergency vehicle. The AR display 900 may be generated by an on-board system (such as the on-board system 10 of FIG. 1) based on analysis of environmental data and/or received indications of a presence of an emergency vehicle included therein. It should be appreciated that the AR display 900 is presented on an AR viewer built-into a front windshield (such as the AR viewers 141, 241, 341, 441, 541), the techniques disclosed herein may be adapted to present similar AR displays on other AR viewer devices (such as the wearable AR viewers 70, 170 of FIGS. 1, 2B, respectively, the AR viewer built-into a side window 140 of FIG. 2A, and/or other types of built-in AR viewers 40 of FIG. 1). It should be appreciated that the example AR displays illustrated herein are merely exemplary, and alternative AR displays may include additional, fewer, and/or alternative indications of the vehicle safety indicia.

Prior to presenting the AR display 900, the on-board system may first detect the presence of the emergency vehicle. For example, the on-board system may be configured to decode VLC communications and/or detect the presence of a laser emitted by a smart infrastructure device (such as the smart infrastructure devices 80, 880 of FIGS. 1 and 8, respectively). As another example, the on-board system may be configured to detect a broadcast V2V signal emitted by the emergency vehicle. In this example, the information encoded into the detected V2V signal may be the same information encoded in the VLC signal emitted by the smart infrastructure device.

The on-board system may then compare a location and/or direction of travel of the emergency vehicle to a current location of the on-board system to determine a relative position therebetween. For example, the on-board system may compare GPS coordinates obtained from the emergency vehicle and/or a smart infrastructure device to GPS data generated by a sensor system of the vehicle. As another example, the on-board system may compare street and/or address information obtained from the emergency vehicle and/or the smart infrastructure device to a current location using an on-board mapping application. In the illustrated example, the on-board system determines that the emergency vehicle is located behind the on-board system. Accordingly, the on-board system may configure the AR display 900 to display an AR indication 943 indicating the relative position of the emergency vehicle.

In addition to displaying an indication of the relative position, the on-board system may determine a maneuver to safely yield to the emergency vehicle. For example, the on-board system may be configured to analyze environmental data (such as image data and/or ranging data) to identify a location on the side of the road at which the vehicle can safely pull over. Accordingly, the on-board system may configure the AR display 900 to include an AR indication 945 of the maneuver and/or a textual indication of the maneuver 946. It should be appreciated that the on-board system may configure the AR display 900 such that the AR indication 945 overlays with the actual location on the road at which the vehicle should pull over.

Figure 10:
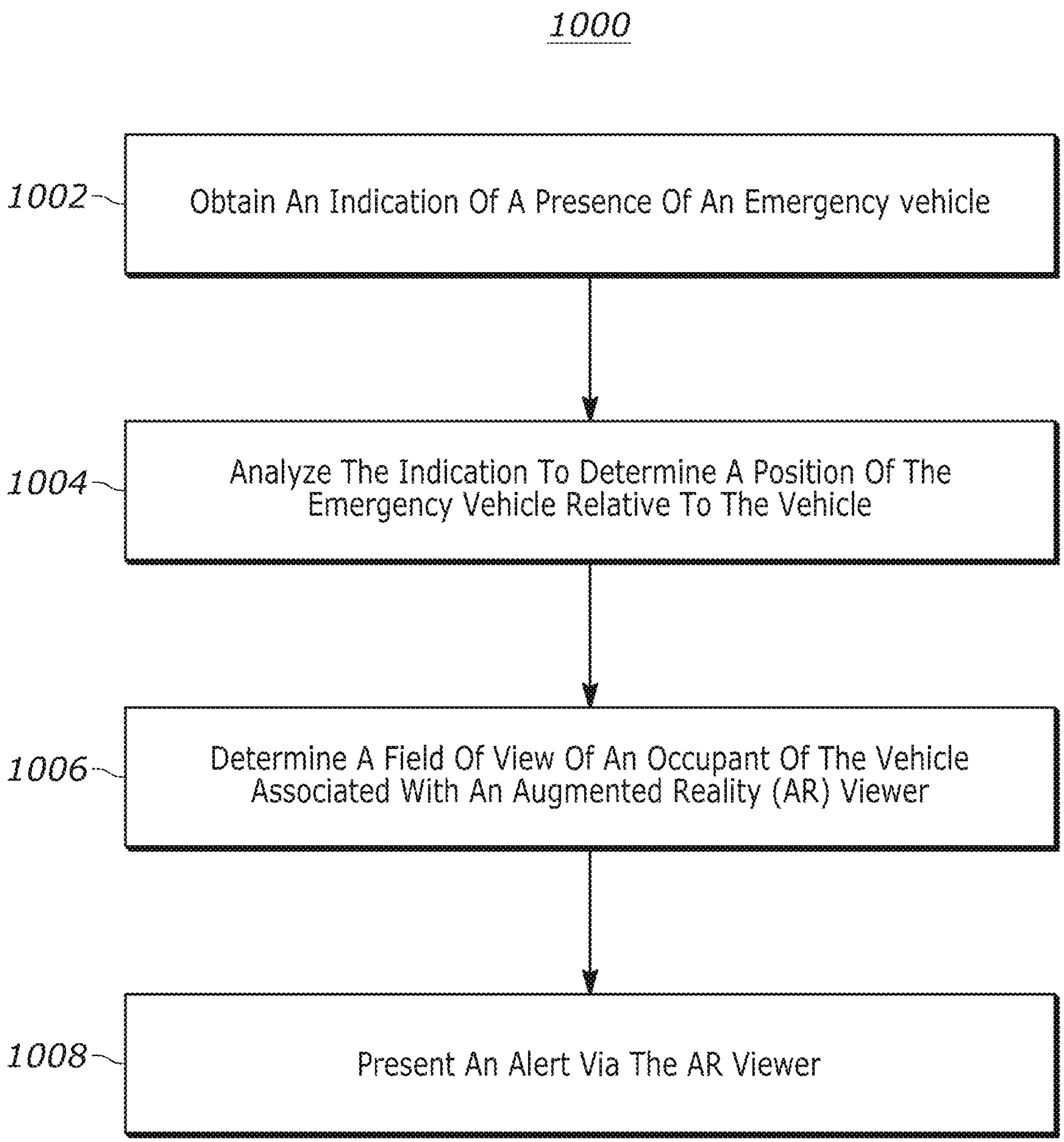
FIG. 10 illustrates a block diagram of an exemplary computer-implemented method for enhanced emergency vehicle warnings via AR, in accordance with embodiments disclosed herein.

Turning now to FIG. 10, illustrated is an exemplary computer-implemented method 1000 for enhanced emergency vehicle warnings via AR. The method 1000 may be performed by an electronic device, e.g., a processing unit (such as the processing unit 30 of FIG. 1) of an on-board system (such as the on-board system 10 of FIG. 1) of a vehicle (such as the vehicles 112 of FIGS. 1, 2A, and 2B).

The method 1000 may begin when the electronic device obtains an indication of a presence of an emergency vehicle (block 1002). In some embodiments, the electronic device receives the indication from an electronic device on-board the emergency vehicle (such as via V2V communications). Additionally or alternatively, the on-board system may receive the indication from a smart infrastructure device. For example, the smart infrastructure device may be at least one of a street light or a traffic light.

In some embodiments, the electronic device may receive the indication by detecting, via a photodetector associated with the vehicle, a visual light communication (VLC) signal that includes the indication. Additionally or alternatively, the electronic device may detect, via a photodetector associated with the vehicle, a laser emitted from the smart infrastructure device.

At block 1004, the electronic device analyzes the indication to determine a position of the emergency vehicle relative to the vehicle. For example, the indication may include GPS coordinates and/or a current address of the emergency vehicle. In embodiments where the indication is obtained via a laser emitted by a smart infrastructure device, the electronic device may determine the relative position based upon an orientation of the laser.

At block 1006, the electronic device determines a field of view of an occupant of the vehicle associated with an Augmented Reality (AR) viewer. In some embodiments, the AR viewer is a built-in AR viewer (such as the AR viewers, 40, 140, 141, 241, 341, 441, 541, 941), which may be at least one of a smart windshield, a smart window, or a smart mirror of the vehicle. In other embodiments, the AR viewer is a wearable AR viewer (such as the AR viewers 70, 170). In these embodiments, the electronic device may obtain orientation data from the AR viewer to assist in determining the field of view. In either case, to determine the field of view, the electronic device may be configured to obtain image data generated by an image sensor configured to have a field of view oriented within the vehicle (such as the image sensor 122 of FIGS. 2A, 2B) and, based upon the image data, determine a location of the occupant within the vehicle.

At block 1008, the electronic device presents an alert via the AR viewer based upon the location of the emergency vehicle and the determined field of view. In some embodiments, the electronic device presents an indication of a location of the emergency vehicle (such as the AR indication 943 of FIG. 9). Additionally or alternatively, the electronic device may present an indication of a maneuver to perform to yield to the emergency vehicle (such as the AR indications 945, 946 of FIG. 9). The method may include additional, fewer, or alternate actions, including those discussed elsewhere herein.

AR Outdoor Display Techniques

As described above, traditional outdoor billboards are not adapted to any individuals. As such, the displayed advertisements are often irrelevant or of little interest to vehicle occupants. Accordingly, techniques described herein relate to applying AR techniques to outdoor displays, such as billboards, to present personalized messages that are more likely to be relevant to vehicle occupants. In some embodiments, the personalized messages may be tailored to provide indications of services that may ameliorate driver impairments (e.g., tiredness, hunger, distractedness).

Figure 11:
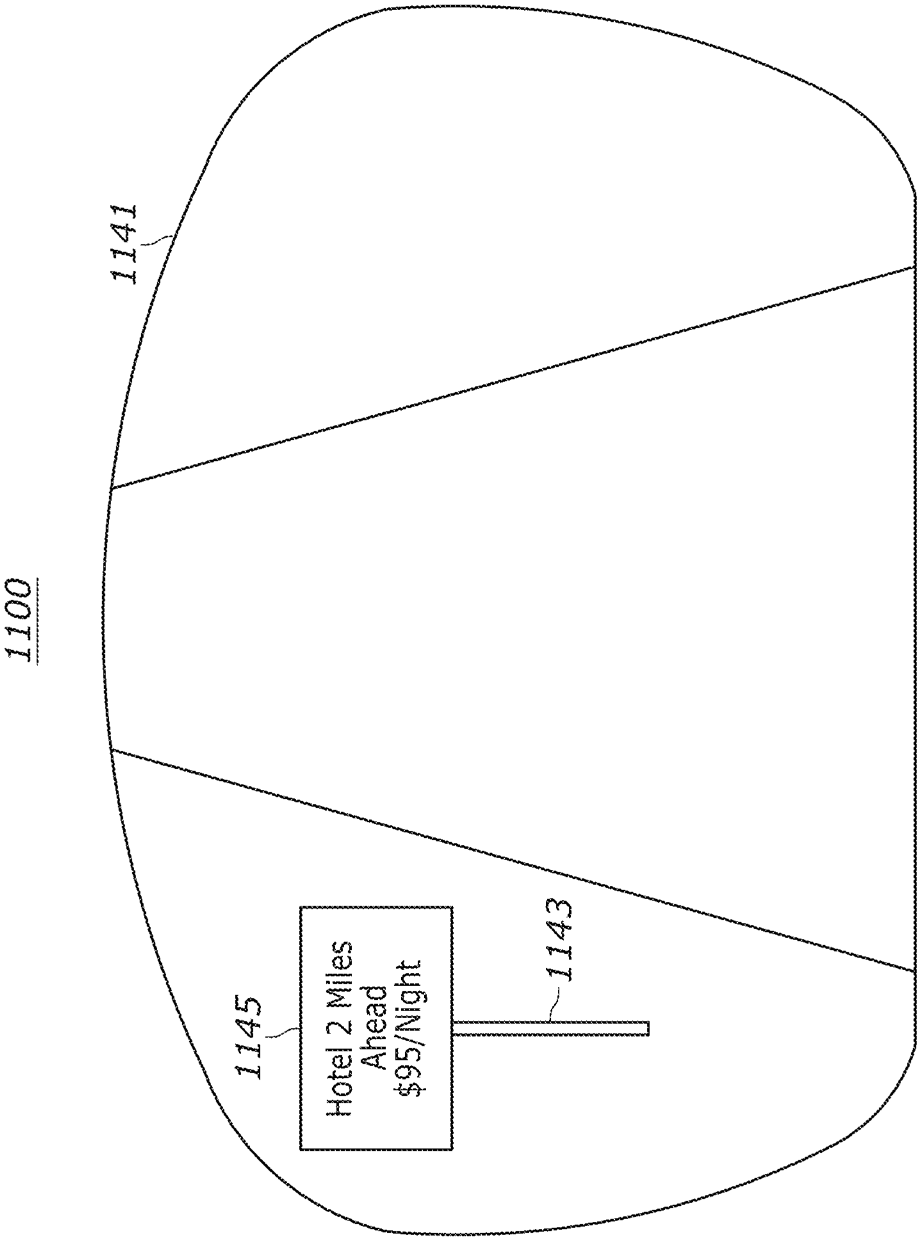
FIGS. 11 and 12 illustrate exemplary AR displays that include occupant-specific images.
Figure 12:
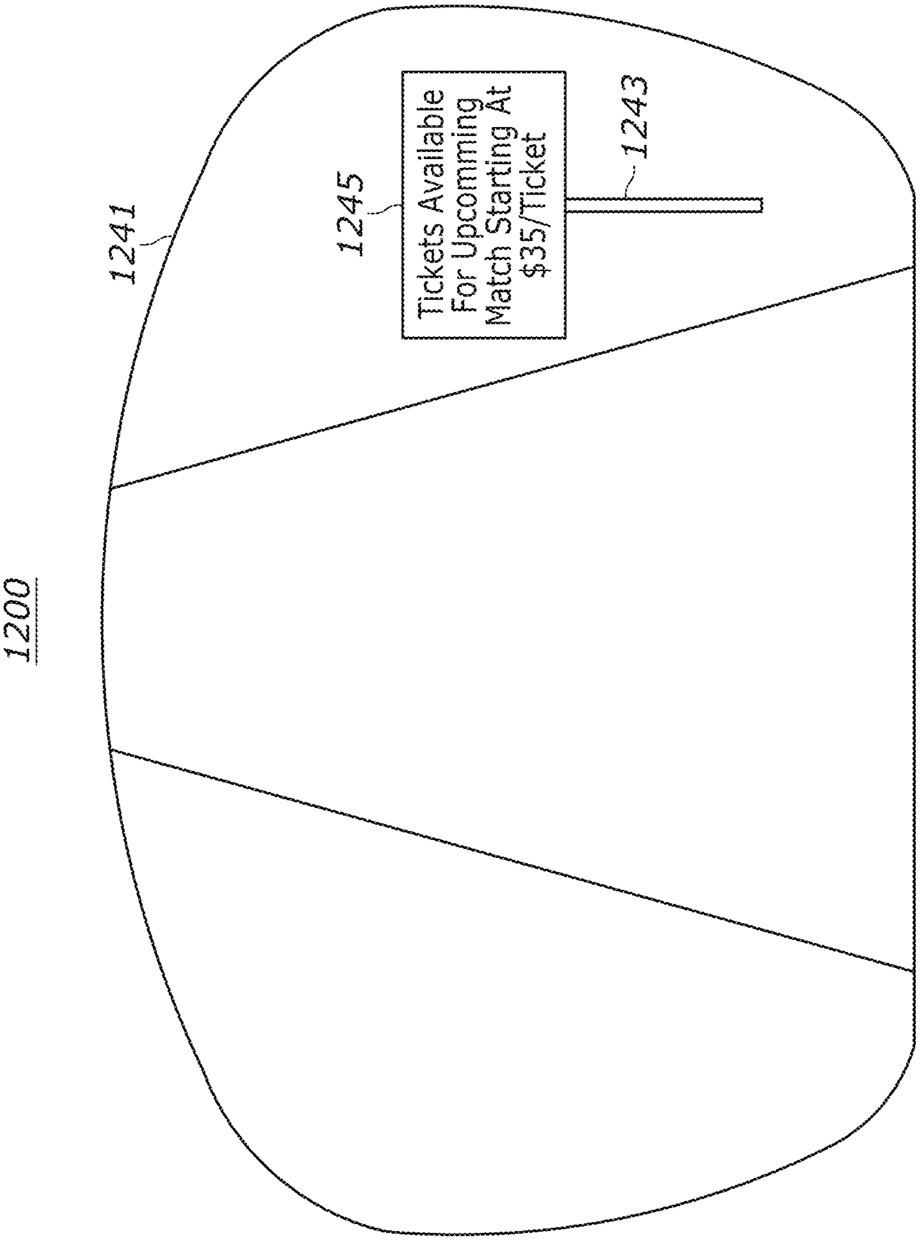

Turning now to FIGS. 11 and 12, illustrated are exemplary AR displays 1100, 1200 configured to present AR message via outdoor displays 1143, 1243. The AR displays 1100, 1200 may be generated by an on-board system (such as the on-board system 10 of FIG. 1) based on analysis of environmental data, contextual data, and/or received indications of a location of the outdoor displays 1143, 1243. It should be appreciated that the AR displays 1100, 1200 are presented on an AR viewer built-into a front windshield (such as the AR viewers 141, 241, 341, 441, 541, 941), the techniques disclosed herein may be adapted to present similar AR displays on other AR viewer devices (such as the wearable AR viewers 70, 170 of FIGS. 1, 2B, respectively, the AR viewer built-into a side window 140 of FIG. 2A, and/or other types of built-in AR viewers 40 of FIG. 1). It should be appreciated that the example AR displays illustrated herein are merely exemplary, and alternative AR displays may include additional, fewer, and/or alternative indications of the vehicle safety indicia.

In some embodiments, the on-board system is in communication with an external server (such as the server 90 of FIG. 1) to support the AR display techniques disclosed herein. For example, the server 90 may maintain a database of outdoor display locations (such as the database 94 of FIG. 1). Accordingly, the on-board system may periodically send a current location of the vehicle to the server in order to obtain a set of outdoor displays proximate to the vehicle. In the illustrated examples, the location associated with the outdoor display 1143 and 1243 are included in the set of outdoor displays. As the vehicle approaches the location associated with the outdoor display 1143 or 1243, the on-board system may query the server to obtain an image to present on the outdoor display.

To ensure that the server obtains a relevant image, the on-board system may periodically transmit contextual data to the server. For example, the on-board system may monitor image data generated by image sensors directed inside the vehicle (such as the image sensors 122 of FIGS. 2A and 2B). In this example, the on-board system may analyze the image data to determine whether the driver is tired, drowsy, or otherwise appears to need rest in order to safely operate the vehicle. For example, the on-board system may determine whether the eyes of the driver are moving slowly, appear less open than usual, and/or exhibit other indications that may be derived via the use of an imaging processing model. If the on-board system makes such a determination, the on-board system may transmit an indication of the state of the occupant to the server.

In another example of detecting a drowsiness condition, the server may include a sentiment analysis model configured to operate on audio data. Accordingly, the on-board system may also capture audio data using an audio sensor within the vehicle (such as the audio sensor 26 of FIG. 1) and send the audio data to the server for processing via the sentiment analysis model. In some scenarios, the sentiment analysis model (such as one of the models 92 of FIG. 1) may detect speech patterns that indicate that a speaker is drowsy. It should be appreciated that the sentiment analysis model may also be configured to detect other sentiments, such as happiness, anger, anxiety, and so on.

In response to detecting that occupant is drowsy, the server may obtain an image related to ameliorating the drowsiness condition of the driver. To obtain the image, the server may be integrated with an advertising platform. For example, the server may facilitate a real-time auction for an advertisement based on an indication of the vehicle's location and the drowsy state of the driver. In the illustrated example of FIG. 11, a nearby hotel won the auction and generated the image 1145 to be presented via the AR viewer 1141.

In yet other examples, the server may also include a natural language processing (NLP) model (such as one of the models 92 of FIG. 1) that processes the transcribed audio data to determine a subject indicated by the audio. In some embodiments, the on-board system transcribes the audio data into text prior to sending the data to the server. In other embodiments, the server may transcribe the raw audio data. The NLP model may then analyze the transcribed audio data to identify a subject associated with a captured conversation. For example, if audio data includes the occupants discussing different types of food, the NLP model may output an indication that the audio data relates to the subject of food. In this example, the server may obtain an image for a food vendor (e.g., a restaurant, a grocery store, a gas station, etc.) proximate to the vehicle to present via an outdoor display.

In still other examples, the on-board system is integrated with an application programming interface (API) of an application executing on a personal electronic device of an occupant. For example, the on-board system may be integrated with an API of a personal assistant application such that the on-board system receives indications of queries provided by vehicle occupants. In one scenario, the occupant may ask the personal assistant application for information about sports scores. The on-board system may then route the query and/or results to the server to obtain an image relevant thereto. In the example illustrated in FIG. 12, the server obtains the image 1245 related to tickets for a sports match.

After receiving an image from the server, the on-board system may then monitor environmental data to detect the presence of the outdoor display on which the image is to be displayed (such as the outdoor displays 1143, 1243). In some scenarios, the outdoor display is an all-white or all-green billboard. In response to detecting the presence of the outdoor display, the on-board system may then present AR displays 1100, 1200 that overlay the image obtained from the server onto the outdoor displays 1143, 1243, respectively.

It should be appreciated that in some embodiments, the server does not obtain an advertisement, but instead generates and/or obtains an image indicative of a safety tip to ensure safe operation of the vehicle. For example, in response to detecting the drowsiness condition, the server may send the on-board system an image suggesting that a driver takes a short break from driving. As another example, in response to detecting a distracted condition, the server may send the on-board system an image suggesting that driver remains focused on the road.

Figure 13:
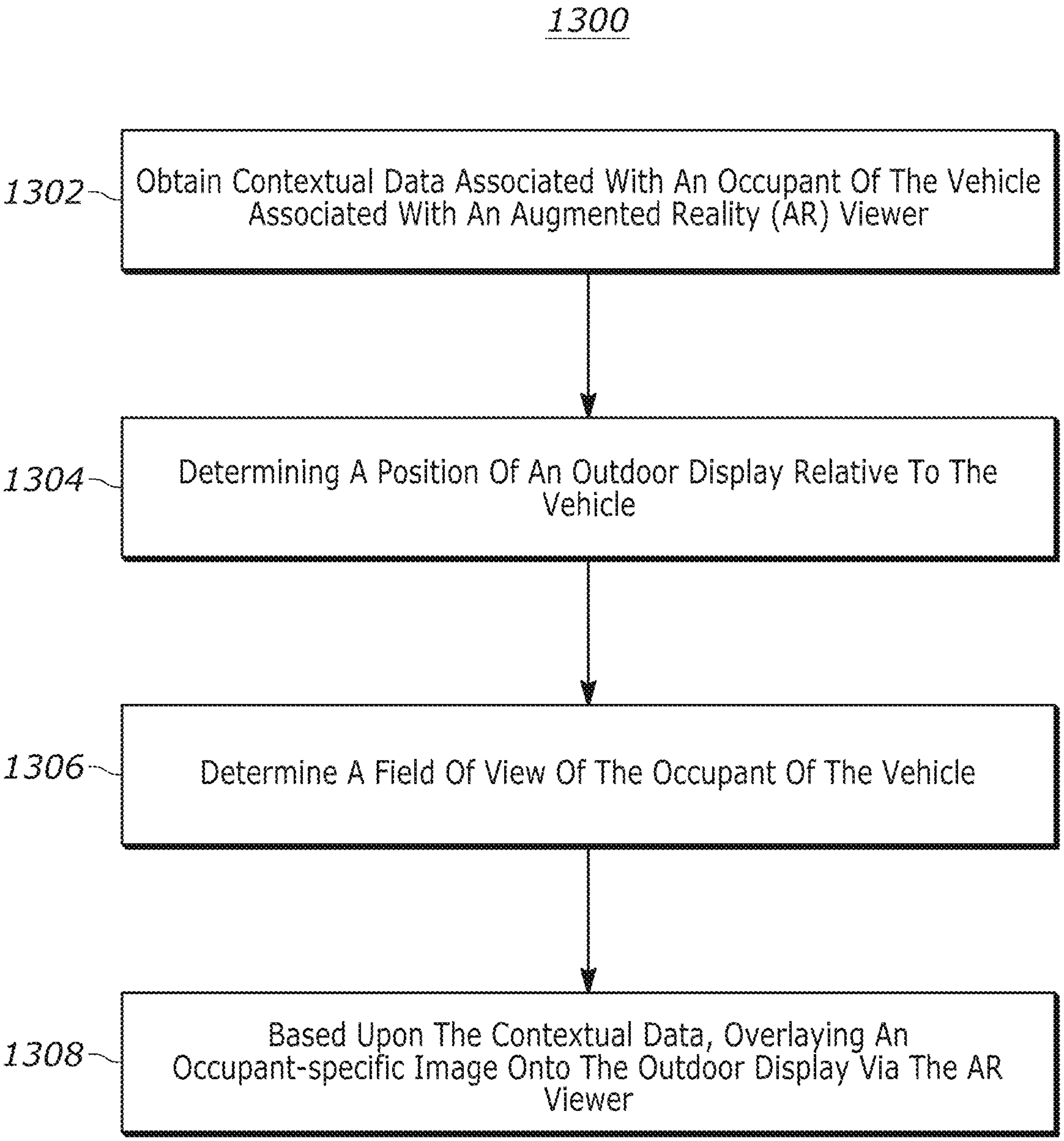
FIG. 13 illustrates a block diagram of an exemplary computer-implemented method for enhanced outdoor displays via AR, in accordance with embodiments disclosed herein.

Turning now to FIG. 13, illustrated is an exemplary computer-implemented method 1300 for enhanced outdoor displays via AR. The method 1300 may be performed by an electronic device, e.g., a processing unit (such as the processing unit 30 of FIG. 1) of an on-board system (such as the on-board system 10 of FIG. 1) of a vehicle (such as the vehicles 112 of FIGS. 1, 2A, and 2B).

The method 1300 may begin when the electronic device obtains contextual data associated with an occupant of the vehicle associated with an augmented reality (AR) viewer (block 1302). In some embodiments, the AR viewer is a built-in AR viewer (such as the AR viewers, 40, 140, 141, 241, 341, 441, 541, 941, 1141, 1241), which may be at least one of a smart windshield, a smart window, or a smart mirror of the vehicle. In other embodiments, the AR viewer is a wearable AR viewer (such as the AR viewers 70, 170).

In some embodiments, the electronic device obtains the contextual data by receiving the contextual data from a personal electronic device associated with the occupant of the vehicle and/or an application executing thereon. Additionally or alternatively, the electronic device may obtain the contextual data from an audio sensor disposed in the vehicle and/or an image sensor configured to have a field of view oriented within the vehicle.

At block 1304, the electronic device determines a position of an outdoor display relative to the vehicle. For example, the position may be determined based upon location information of the outdoor display received from a server and/or by analyzing environmental data to detect a presence of the outdoor display.

At block 1306, the electronic device determines a field of view of an occupant of the vehicle associated with an augmented reality (AR) viewer. In embodiments where the AR viewer is a wearable AR viewer, the electronic device may obtain orientation data from the AR viewer to assist in determining the field of view. Regardless, to determine the field of view, the electronic device may be configured to obtain image data generated by an image sensor configured to have a field of view oriented within the vehicle (such as the image sensor 122 of FIGS. 2A, 2B) and, based upon the image data, determine a location of the occupant within the vehicle.

At block 1308, based on the contextual data, the electronic device overlays an occupant-specific image onto the outdoor display via the AR viewer. In some embodiments, to obtain the occupant-specific image, the electronic device may input the contextual data into a sentiment analysis model to obtain a condition associated with the occupant. The electronic device may then obtain an image associated with the output condition. For example, if the condition associated with the occupant is drowsiness, the image associated with the condition may include an indication of a hotel proximate to the vehicle.

In some embodiments, the electronic device inputs the contextual data into a natural language processing (NLP) model to obtain a subject relevant to the occupant. The electronic device may then obtain an image associated with the output subject. For example, if the subject relates to food, the image associated with the subject may include an indication of a food vendor proximate to the vehicle. It should be appreciated that the electronic device may "input" the contextual data into the sentiment and/or NLP model by transmitting a message to a server that is formatted in such a manner (e.g., in compliance with an API of the server) that causes the server to input the contextual data into a model hosted thereat. The method may include additional, fewer, or alternate actions, including those discussed elsewhere herein.

Additional Considerations

As used herein, the term "indicia" means both singular and plural. For example, the phrase "vehicle safety indicia" may mean either of a single vehicle safety indicium (e.g., an ice patch) or multiple vehicle safety indicia (e.g., the presence of multiple vehicle, etc.).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for enhanced emergency vehicle warnings via Augmented Reality (AR), the computer-implemented method comprising:

obtaining, via one or more processors of an electronic device on-board a vehicle and from a smart infrastructure device, a wireless communication signal indicating an indication of a position of an emergency vehicle, wherein:

obtaining the indication comprises:

detecting, via a photodetector associated with the vehicle, a visual light communication (VLC) signal from the smart infrastructure device that indicates the position of the emergency vehicle; or detecting, via a photodetector associated with the vehicle, a laser emitted from the smart infrastructure device;

determining, via the one or more processors, a field of view of an occupant of the vehicle associated with an AR viewer; and based upon a comparison of the position of the emergency vehicle and the field of view, presenting, via the one or more processors, an alert via the AR viewer.

2. The computer-implemented method of claim 1, wherein the method further comprises:

receiving, from an electronic device on-board the emergency vehicle, a second indication of the position of the emergency vehicle.

3. The computer-implemented method of claim 1, wherein the smart infrastructure device is at least one of a street light or a traffic light.

4. The computer-implemented method of claim 1, wherein the AR viewer is at least one of a smart windshield, a smart window, or a smart mirror of the vehicle.

5. The computer-implemented method of claim 1, wherein the AR viewer is a wearable AR viewer.

6. The computer-implemented method of claim 5, wherein determining the field of view comprises:

obtaining, via the one or more processors, orientation data from the AR viewer.

7. The computer-implemented method of claim 1, wherein determining the field of view comprises:

obtaining, via the one or more processors, image data generated by an image sensor configured to have a field of view oriented within the vehicle; and based upon the image data, determining, via the one or more processors, a location of the occupant within the vehicle.

8. The computer-implemented method of claim 1, wherein presenting the alert comprises:

presenting, via the one or more processors, an indication of a location of the emergency vehicle and/or an indication of a maneuver to perform to yield to the emergency vehicle.

9. The computer-implemented method of claim 1, wherein presenting the alert comprises:

generating, via a sensor of the vehicle, sensor data indicating an external environment of the vehicle; and presenting, by the one or more processors, information indicating the external environment of the vehicle based upon the sensor data.

10. The computer-implemented method of claim 9, wherein the sensor includes one or more of an image sensor or a ranging sensor.

11. The computer-implemented method of claim 9, wherein the external environment of the vehicle includes one or more of a road condition or a presence of another vehicle.

12. A system for enhanced emergency vehicle warnings via Augmented Reality (AR), the system comprising:

one or more processors of an electronic device on-board a vehicle; and one or more non-transitory memories storing processor-executable instructions that, when executed by the one or more processors, cause the system to:

obtain from a smart infrastructure device, an indication of a position of an emergency vehicle, wherein obtaining the indication comprises:

detecting, via a photodetector associated with the vehicle, a visual light communication (VLC) signal from the smart infrastructure device that indicates the position of the emergency vehicle; or detecting, via a photodetector associated with the vehicle, a laser emitted from the smart infrastructure device;

determine a field of view of an occupant of the vehicle associated with an AR viewer; and based upon a comparison of the position of the emergency vehicle and the field of view, present an alert via the AR viewer.

13. The system of claim 12, wherein the instructions, when executed, further cause the system to:

receive, from an electronic device on-board the emergency vehicle, the indication of the indication of the position of the emergency vehicle.

14. The system of claim 12, wherein the smart infrastructure device is at least one of a street light or a traffic light.

15. The system of claim 12, wherein to present the alert via the AR viewer, the instructions, when executed, cause the system to:

generate, via a sensor of the vehicle, sensor data indicating an external environment of the vehicle; and present information indicating the external environment of the vehicle based upon the sensor data.

16. The system of claim 15, wherein the sensor includes one or more of an image sensor or a ranging sensor.

17. The system of claim 15, wherein the external environment of the vehicle includes one or more of a road condition or a presence of another vehicle.

18. A non-transitory computer-readable storage medium storing computer-executable instructions that when executed by one or more processors of an electronic device on-board a vehicle, cause the one or more processors to:

obtain, from a smart infrastructure device, an indication of a position of an emergency vehicle, wherein obtaining the indication comprises:

detecting, via a photodetector associated with the vehicle, a visual light communication (VLC) signal from the smart infrastructure device that indicates the position of the emergency vehicle; or detecting, via a photodetector associated with the vehicle, a laser emitted from the smart infrastructure device;

determine a field of view of an occupant of the vehicle associated with an AR viewer; and based upon a comparison of the position of the emergency vehicle and the field of view, present an alert via the AR viewer.

* * * * *